(12) United States Patent
Storek et al.

(10) Patent No.: US 10,226,145 B2
(45) Date of Patent: Mar. 12, 2019

(54) LIQUID MOVEMENT AND CONTROL WITHIN A ROTATABLE CONTAINER FOR FOOD PREPARATION

(71) Applicant: LeguPro AB, Gothenburg (SE)

(72) Inventors: David Storek, Gorhenburg (SE); Robert P. Otillar, Mountain View, CA (US); Antonia L. Sequeira, Mountain View, CA (US)

(73) Assignee: LEGUPRO AB, Gothenburg (SE)

( * ) Notice: Subject to any disclaimer, the term of this patent is extended or adjusted under 35 U.S.C. 154(b) by 0 days.

(21) Appl. No.: 15/655,609

(22) Filed: Jul. 20, 2017

(65) Prior Publication Data

US 2018/0008080 A1      Jan. 11, 2018

Related U.S. Application Data

(63) Continuation of application No. 13/261,583, filed as application No. PCT/US2011/046520 on Aug. 4, 2011, now Pat. No. 9,730,542.

(60) Provisional application No. 61/370,466, filed on Aug. 4, 2010.

(51) Int. Cl.
| | |
|---|---|
| *A47J 27/00* | (2006.01) |
| *A47J 27/62* | (2006.01) |
| *A23L 5/10* | (2016.01) |
| *A47J 47/01* | (2006.01) |

(52) U.S. Cl.
CPC .............. *A47J 27/002* (2013.01); *A23L 5/13* (2016.08); *A47J 27/62* (2013.01); *A47J 47/01* (2013.01)

(58) Field of Classification Search
CPC .. A23L 5/13; A47J 27/002; A47J 27/62; A47J 7/01; A47J 27/00; A47J 27/004; A47J 2027/006; A47J 2027/008; A47J 27/04; A47J 2027/043; A47J 27/08; A47J 27/10; A47J 27/14; A47J 27/16; A47J 27/21; A47J 27/21008; A47J 27/21041; A47J 27/21083; A47J 217/21091; A47J 37/12
USPC ................ 99/324–327, 330–332, 334–335, 99/341–342, 359, 371, 403–410, 469, 99/471; 219/385–386, 389, 415, 420, 219/429–430, 433, 435–439, 441, 442; 426/665, 474, 506–511, 523
See application file for complete search history.

(56) References Cited

U.S. PATENT DOCUMENTS

2010/0018412 A1*   1/2010   Gruban ................. A47J 27/004
                                                                      99/357

* cited by examiner

*Primary Examiner* — Michael G Hoang
(74) *Attorney, Agent, or Firm* — Fenwick & West LLP

(57) ABSTRACT

An apparatus and method for controlling the movement of liquids into and out of a container is described. The cleanable, portable, fully automated apparatus includes a main container for holding the food product, a liquid inlet container having a liquid inlet and inlet valve for controllably providing liquid into the main container and a liquid outlet container receiving liquid drained from the main container. A heater automatically heats the main container and a motor rotates or otherwise moves the main container from a receiving position for receiving fresh liquid from the inlet container to a drainage position for draining waste liquid via gravity from the main container into the outlet container. This rotation/movement of the main container can be used repeatedly to add fresh liquid and remove waste liquid during multiple fully automated cycles (e.g., sprouting, rinsing, soaking, cooking, etc.) that do not require user interaction.

20 Claims, 11 Drawing Sheets

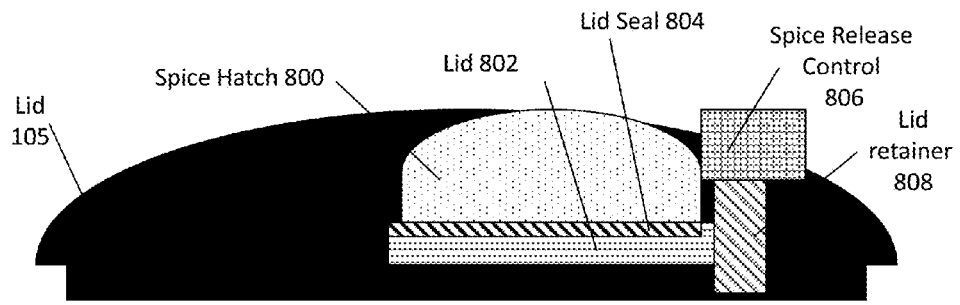
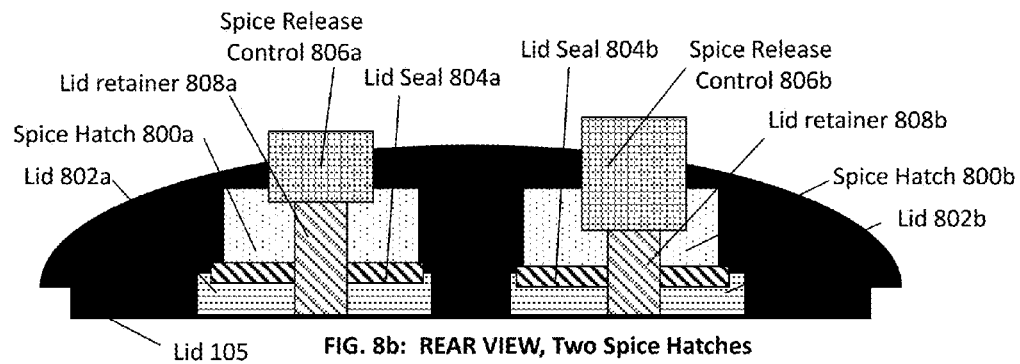
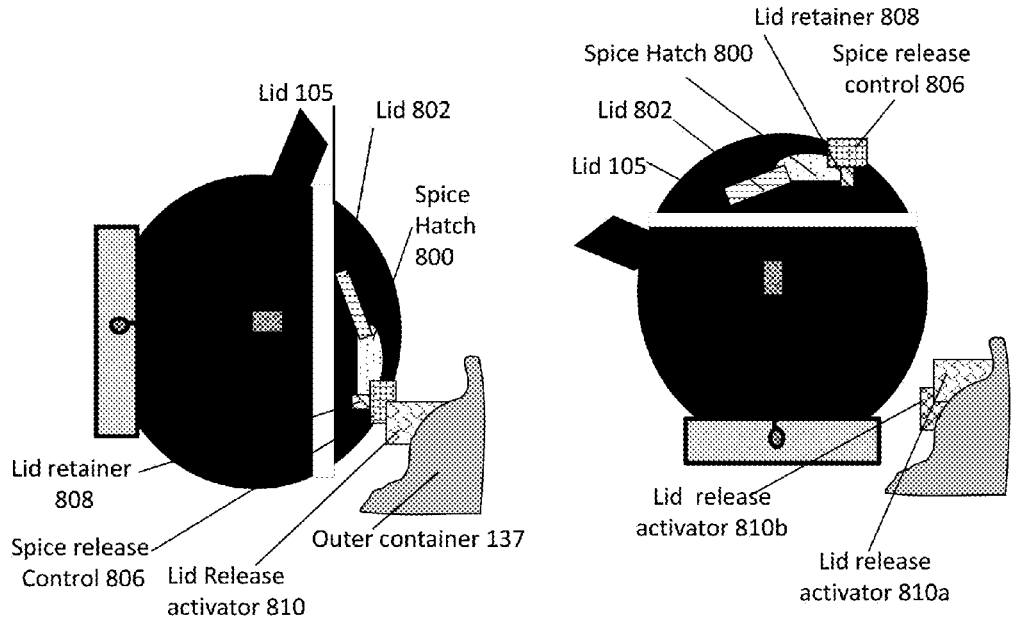
FIG. 8

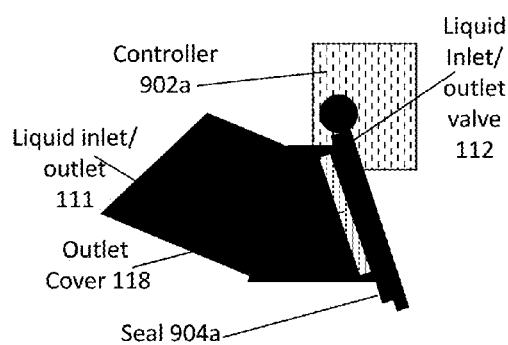
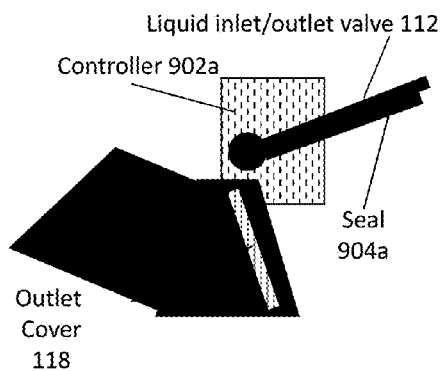
FIG. 9a: Inlet/Outlet valve closed
FIG. 9b: Inlet/Outlet valve open
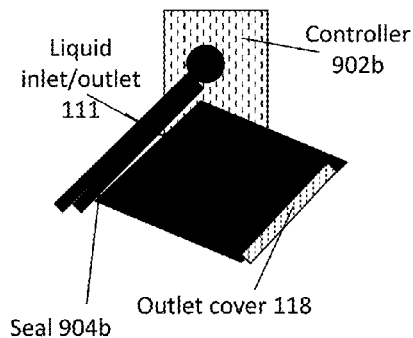
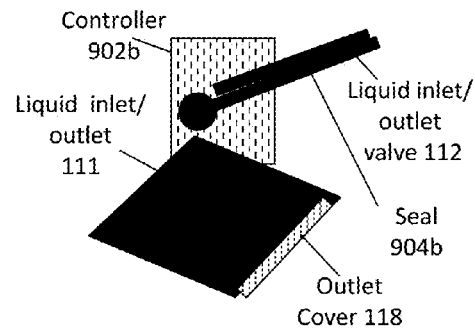
FIG. 9c: Inlet/Outlet valve closed
FIG. 9d: Inlet/Outlet valve open
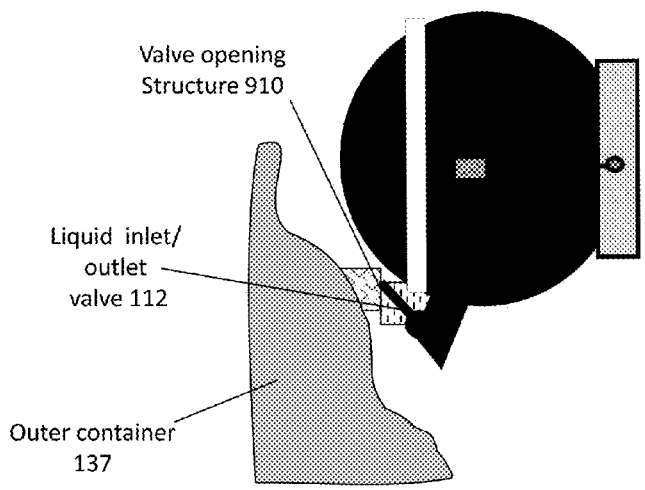
FIG. 9e: Valve Opening

LIQUID MOVEMENT AND CONTROL WITHIN A ROTATABLE CONTAINER FOR FOOD PREPARATION

RELATED APPLICATIONS

This application is a continuation of U.S. patent application Ser. No. 13/261,583, filed on Apr. 19, 2013, which is a national phase application of PCT/US2011/046520, filed on Aug. 4, 2011, which claims the benefit of U.S. Provisional Application No. 61/370,466, entitled "Liquid Movement and Control within a Container for Food Preparation," filed Aug. 4, 2010, which are all incorporated herein by reference in their entireties for all purposes.

BACKGROUND OF THE INVENTION

Field of the Invention

This invention pertains in general to a container for controlling movement of liquids, and more specifically to an apparatus for preparing and cooking food products using a rotatable container.

Description of the Related Art

While many kitchen tasks have been automated, there are still some unmet needs that have long been a problem in the household food-preparation/cooking world. For example, preparing and cooking dry beans is a notoriously laborious process that can requires hours, if not days, and includes many steps requiring the cook's presence. Dry, unprocessed beans must often first be rinsed and then soaked in fresh liquid, and the soaking can commonly take hours (e.g., 4 to 8 hours or overnight; soybeans may require soaking 12 hours or more). Commonly, the soaking water is then drained and the beans are then cooked in fresh water (often in a pot on the stove for e.g., 1 to 2 hours). Since salt can affect the cooking, addition of salt can be at controlled times in the cooking process. Further, some users prefer to first sprout the beans to increase the health benefit and nutritional value of beans. To sprout dry beans, the cook typically lays the dry beans out in a container with enough water to keep them moist and carefully monitors the water level to avoid drying out or over soaking. Typically, the beans sit for 3 or 4 days, with temperature and lighting conditions monitored to ensure proper sprouting. Thus, multiple labor-intensive steps for cooking and/or sprouting that require the user to return to the kitchen and take action, all the while carefully managing the temperature and environment of the beans.

Currently, there is no device that can perform all or even most of these sprouting/preparation/cooking steps in an automated fashion. Crock pots or slow cookers, rice cookers, and bread machines are popular kitchen appliances for having the ability to allow a user to insert the uncooked food in the pot early in the day and return to a fully-cooked meal at the end of the day. Yet these machines cannot automatically prepare or cook foods that require movement into and out of fresh liquids, or that otherwise require a controlled movement associated with liquids. While there are a few commercial cookers used by restaurants for cooking beans in large quantities, none of these devices are helpful to the typical consumer in the average household who wishes to prepare a meal involving dry, unprocessed beans or other cooking processes requiring fresh liquids (e.g., they are too large, heavy, complicated, labor-intensive, and/or are not suitable for home use, portable or easily cleanable with standard home washing equipment, etc.).

SUMMARY OF THE INVENTION

An apparatus and method for moving a liquid to and from a main container that can be used for cooking food products is disclosed. The apparatus combines the processes of hydration and cooking of food products into one compact main container. A liquid inlet container associated with the main container stores fresh liquid, and has a liquid inlet for controllably providing liquid into the main container with the food product, which is automatically regulated by an inlet valve connected to the liquid inlet. The main container includes a liquid inlet/outlet opening for controllably receiving liquid into the main container when the main container is in a receiving position and for controllably draining liquid from the main container without removing the food product when the main container is in a drainage position. A liquid outlet container receives liquid drained from the main container. A motor associated with the main container moves the main container from the receiving position for receiving liquid to the drainage position for draining liquid via gravity from the main container into the liquid outlet container. A heater associated with the main container automatically heats the food product and the liquid in the main container.

The method is an automated method for preparing a food product in a portable apparatus. The method includes the step of receiving the food product into the main container of the portable apparatus and receiving one or more settings input by a user. The method also includes rotating the main container into a receiving position at which the main container is positioned to receive liquid from a liquid inlet container, and opening an inlet valve connected to the liquid inlet container for controllably providing a controlled amount of liquid into the main container with the food product. The method further includes rotating the main container to a neutral position, and applying heat to the food product and liquid in the main container for preparing (e.g., sprouting, rinsing, soaking, cooking, etc.) the food product. In addition, the method includes rotating the main container into a drainage position at which the main container is positioned to drain liquid from the main container into a liquid inlet container, and draining the liquid from the main container into a liquid outlet container.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 8a includes a side view of the main container lid with a single spice hatch, according to embodiments of the invention.

FIG. 8b includes a rear view of the main container lid with two spice hatches, according to embodiments of the invention.

FIG. 8c includes a side view of the spice hatch release, according to embodiments of the invention.

FIG. 8d includes a side view of the spice hatch after release, according to embodiments of the invention.

FIG. 9a includes a side view of the liquid inlet/outlet with a closed inlet/outlet valve on the inside of the main container, according to embodiments of the invention.

FIG. 9b includes a side view of the liquid inlet/outlet with an open inlet/outlet valve on the inside of the main container, according to embodiments of the invention.

FIG. 9c includes a side view of the liquid inlet/outlet with a closed inlet/outlet valve on the outside of the main container, according to embodiments of the invention.

FIG. 9d includes a side view of the liquid inlet/outlet with a open inlet/outlet valve on the outside of the main container, according to embodiments of the invention.

FIG. 9e includes a side view of the inlet/outlet valve being opened by a structure on the outer container, according to embodiments of the invention.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE INVENTION

I. Apparatus

A. Overview

Figure 1A:
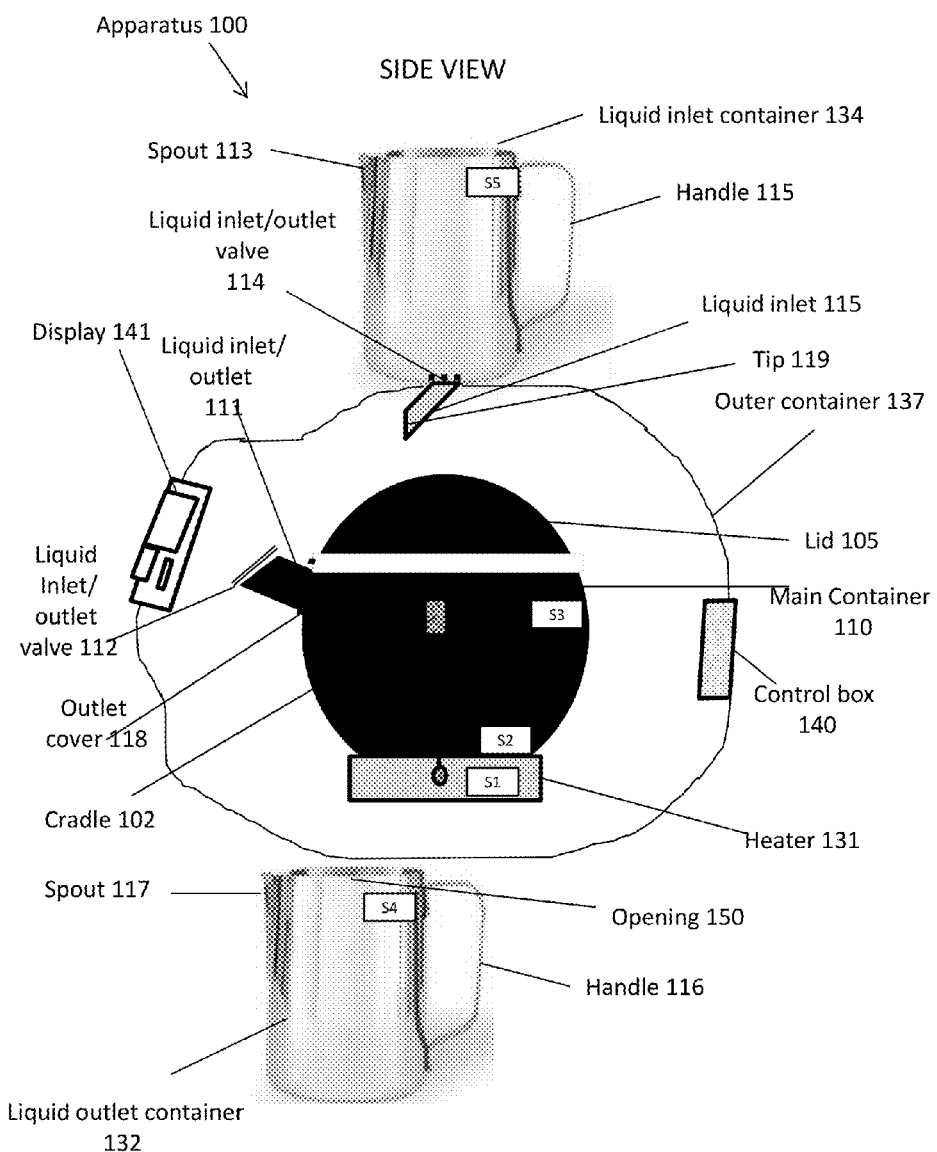
FIG. 1a is a side view of the liquid movement and control apparatus with the liquid inlet and outlet containers, according to embodiments of the invention.
Figure 1B:
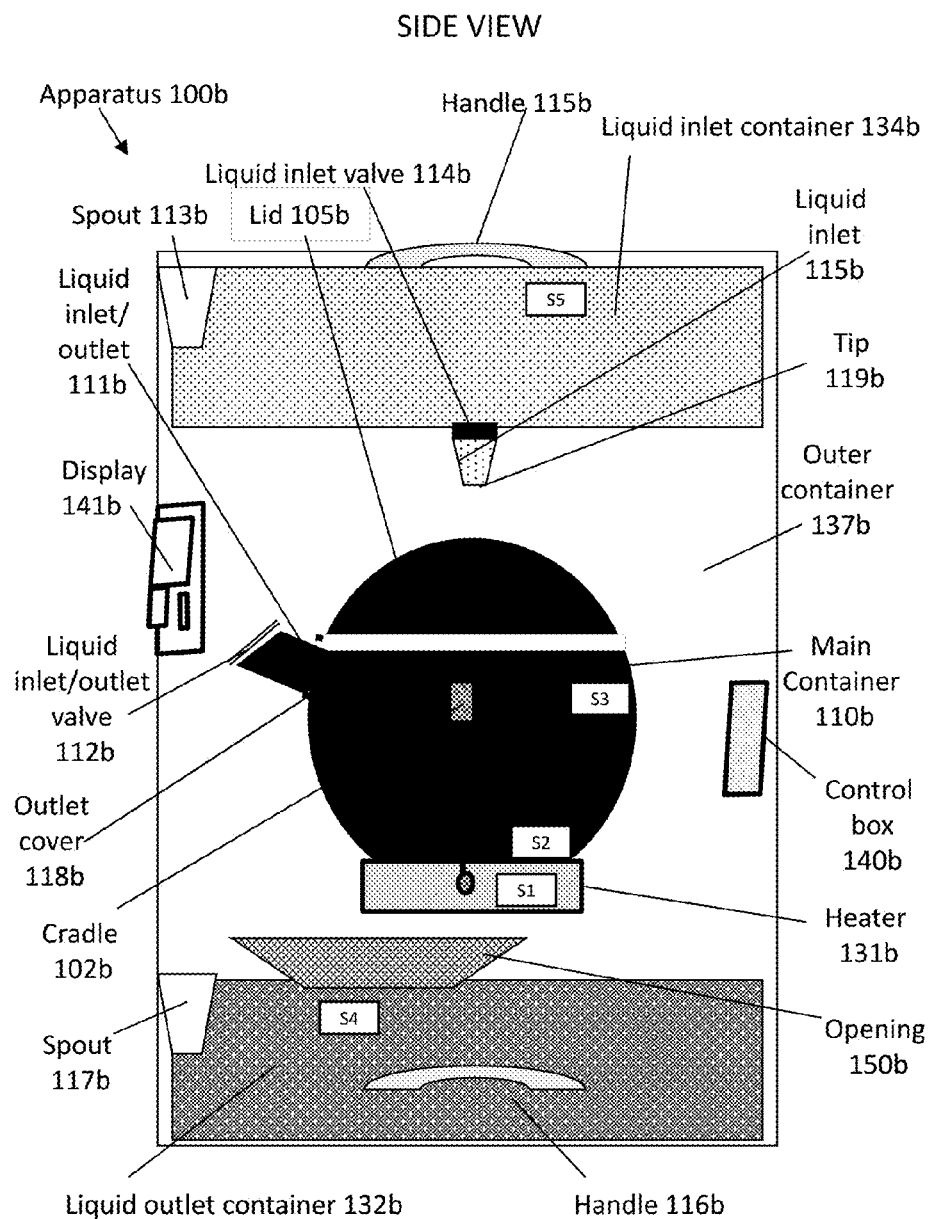
FIG. 1b is a side view of another embodiment of the liquid movement and control apparatus with the liquid inlet and outlet containers, according to embodiments of the invention.
Figure 1C:
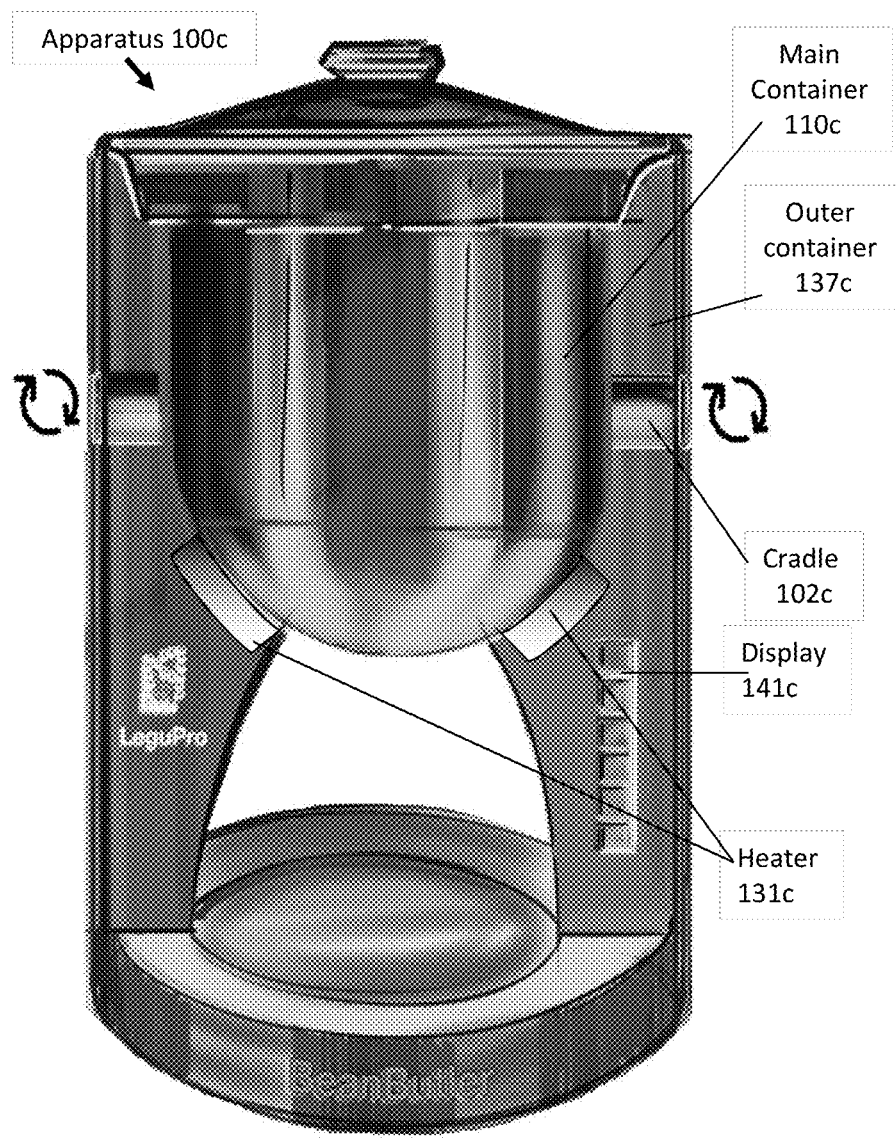
FIG. 1c is a front view of another embodiment of the liquid movement and control apparatus, according to embodiments of the invention.

FIG. 1a illustrates apparatus 100 according to an embodiment of the invention. Similarly, FIG. 1b illustrates apparatus 100b according to an embodiment of the invention and FIG. 1c illustrates apparatus 100c according to an embodiment of the invention. Some embodiments of the apparatus 100, 100b, and/or 100c have different and/or additional components than those shown in FIGS. 1a, 1b, 1c, and the other figures. Likewise, the functionalities can be distributed among the components in a manner different than described herein. Certain components and functions can be incorporated into other components of or associated with the apparatus. When describing the embodiments of the invention below, the examples frequently focus on food products, such as beans and rice, though these examples are meant for illustration only, and the invention is not limited to use with any particular food product or item. In some embodiments, a "food product" means any product meant for human consumption, including ingestion or inhalation. Similarly, where the word "apparatus" is used, it can refer to any of the apparatuses described herein (e.g. in all figures). For clarity, the components of FIG. 1b that correspond to the components of FIG. 1a are given the same reference number, but with a letter "b" added to the end (e.g., main container 110 in FIG. 1a is referred to as main container 110b in FIG. 1b). For clarity, the components of FIG. 1c that correspond to the components of FIG. 1a are given the same reference number, but with a letter "c" added to the end. The description of the components of FIG. 1a throughout generally apply to each of the corresponding components in FIGS. 1b and 1c, as these embodiments can generally function similarly.

Referring now to the invention in more detail, in FIG. 1a, there is shown the apparatus 100 with an outer container 137, a main container 110 (having a liquid inlet/outlet 111), a liquid inlet container 134 (having a liquid inlet 115), and a liquid outlet container 132. The outer container 137 is a chassis or other covering for various components of the apparatus 100, including the main container 110. In brief summary, the main container 110 can be opened via the lid 105 to allow the user to insert food inside, such as dry beans (the outer container 137 can also having a lid or other access method to allow the user to access the main container 110). The user adds fresh liquid (e.g., clean water from a tap) to the liquid inlet container 134. The main container 110 is designed to rotate within the outer container 137 to line up the liquid inlet 115 with the liquid inlet/outlet 111 to receive fresh liquid from the liquid inlet container 134, and to line up the liquid outlet 115 with the opening 150 of the liquid outlet container 132 to deliver waste or used liquid into the liquid outlet container 132. This rotation can be used repeatedly to add fresh liquid into the main container 110 to rinse, soak, cook, etc. the food in the container 110, and then to dump the used liquid into the liquid outlet container 132. The heater 131 heats the main container 110, and the food and liquid inside, for cooking and other processes requiring heat. The components of the apparatus 100 are each described in more detail below.

The liquid inlet container 134 and liquid outlet container 132 are shown as containers with spouts 113, 117 and handles 115, 116. However, other designs are also possible. For example, the handles 115, 116 could be positioned elsewhere on the device (e.g., on the top), the handle can have different shapes, or there can be no handle. As another example, the spouts 113, 117 could be positioned elsewhere or there may be no spout. Similarly, the two containers 132, 134 can be differently shaped, can include lids, can include no or multiple handles/spouts, the can be larger or smaller, they can be reservoirs of liquid sifting within the outer container 137, and so forth. The containers 132, 134 can also be made of a variety of materials, including metal, plastic, glass, ceramic, among others, or a combination of these. The containers 123, 134 can be designed to hold any sort of liquid, including water, juice, sauces, among others. The liquid inlet container 134 typically contains fresh liquid (e.g., fresh water from the tap or other water source) that will be released into the main container 110 for soaking, cooking, cleaning, etc, and the liquid outlet container 132 contains dump/drainage or non-fresh liquid drained from the main container 110. One or both of the containers 132, 134 can further be housed within a larger outer container 137 or can otherwise snap into or attach to the outer container 137. In some embodiments, one or both of the containers 132, 134 are removable from or detachably connected to the container 137. As one example, the liquid outlet container 132 might be removable for cleaning and also can be filled with fresh liquid that it can then be used to transfer into a non-removable fresh liquid inlet container 134. The user can fill the inlet container 134 according to instructions for different meals, based on markings inside the inlet or outlet containers 134, 132, etc.

One or both of the liquid inlet container 134 and the liquid outlet container 132 can be positioned in various ways relative to the outer container 137 and main container 110 (e.g., to the side of the main container 110, not in contact with the main container 110, wrapped around the main container to make the apparatus more compact and with a lower center of gravity, etc.). In an embodiment illustrated in FIG. 3c, the apparatus 100 has a double-bladder design with two or more bladders (e.g. flexible bag, membrane, or moveable partition). In this design, the liquid outlet container 132 is shown as one bladder and the liquid inlet container 134 is shown as another bladder, both contained within the same space 350. The liquid inlet container 134 bladder initially takes up most of the space 350 since it is filled with fresh liquid. As the clean liquid is drained from the bladder 134, the bladder 134 shrinks and the space 350 is filled with the bladder 132 as the bladder 132 is filled with waste liquid. The bladders can be positioned with one on top of the other, side by side, etc. In an embodiment illustrated in FIG. 3d, the apparatus has a single bladder design with one bladder. The single bladder can be an inlet container 134 and the space 350 shown in FIG. 3c can instead act as the liquid outlet container 132. The bladder 134 is initially filled with fresh liquid and takes up most of the outlet container 132 space. As the fresh liquid is used from the bladder 134, the waste liquid is dumped around the bladder 134 into the outlet container 132, taking up the space made available by removing fresh liquid from bladder 134. Similarly, the positions could be reversed to the bladder is the outlet container 132 and the space around the bladder is the inlet container 134. The bladder designs allow the apparatus 100 to be smaller in overall volume, as the size-adjustable container(s) allow sum of the volumes of the inlet and outlet containers at any given time to be substantially smaller than the sum of the maximum possible volumes of the individual inlet and outlet containers. As liquid is removed from the inlet container, the volume formerly occupied by that removed liquid becomes available for holding additional liquid in the outlet container. The bladder designs of FIGS. 3c, 3d can be located below, next to, around, or above the apparatus 100.

The liquid inlet 115 of the liquid inlet container 134 can be designed in various manners, in various shapes, pointed in different directions, in different lengths, etc., or there may be simply an opening at the bottom of the container 134 that acts as the liquid inlet 115. In some embodiments, one or both of the liquid inlet container 134 and the liquid outlet container 132 are not present in the apparatus 100, and instead the apparatus 100 is connected directly to a water source (e.g., a water faucet or home water pipe) and is connected directly to a water disposal (e.g., a kitchen drain or hose, a kitchen pipe, resting in a sink, attached to a temporary container or removable bottle, etc.).

The outer container 137 houses the main container 110 inside which includes a liquid inlet/outlet 111. The main container 110 is designed similar to a teapot in FIG. 1a, with a spout, and can also include a handle in some embodiments. Though other shapes and arrangements are also possible, such as a square container with a liquid inlet/outlet 111 on top, a pouring structure similar to containers 132, 134, a container with a drain outlet 111 at the bottom, and so forth. Similarly, the liquid inlet/outlet 111 can be designed in various manners, in various shapes, pointed in different directions, in different lengths, etc., or there may be simply an opening in the container 110 that acts as the liquid inlet/outlet 111. In some embodiments, the liquid inlet/outlet 111 is two separate structures or inlet/outlets that can be located next to each other or at different positions on the main container 110, where one of the inlet/outlets receives liquid into the container 110 and the other of the inlet/outlets drains the liquid. The main container 110 rests in a cradle 102 on top of a heater 131. These are described in more detail in FIGS. 2 and 3. While the heater 131 is shown beneath the main container 110, it can otherwise be positioned inside the outer container 137 relative to the main container 110. For example, it can be positioned above, surrounding, or to the side of the main container 110, and does not have to be directly in contact with or attached to the main container 110. In some embodiments, there is more than one heater 131 inside the outer container 137 to provide heat to the main container 110. In other embodiments, the heater 131 is not located in a cradle 102, but is contacting the side of main container 110 when the main container 110 requires heating or is in a cooking or neutral position. In some embodiments, the cradle 102 contains a thermally conductive region contacting the heater 131 and conducting heat to the main container 110.

Inside the main container 110 is a food product and a liquid. The food product can be any type of food product that might require preparation and/or cooking, such as rice, beans, cereals, grains, vegetables, fruits, among others. In some embodiments, the food product includes only solid food products, where the solid food product cooked in the main container is consumed by a user. The liquid can be any type of liquid that might be used in the preparation and/or cooking of the food product, such as water, juice, sauces, among others. The food product can be immersed in the liquid, and the liquid can be at other levels relative to the food product, depending on the process being conducted by the apparatus 100. For example, where the food product is beans, the liquid can be at a lower level (e.g., not covering any of the beans or only covering some of the beans) for sprouting, though the liquid may be at a higher level (e.g. covering most or all of the beans) during soaking or cooking.

The liquid inlet container 134 has a liquid inlet 115 attached to it through which liquid can pass from the container 134. The tip 119 of the liquid inlet 115 is positioned adjacent to the main container 110. The main container 110 also has a liquid inlet/outlet 111 or spout through which liquid can exit or enter the main container 110. In some embodiments, the liquid inlet 115 and inlet/outlet 111 are designed to snap or otherwise fit together with the liquid inlet/outlet 111 of the main container during liquid transfer.

The outer container 137 and the main container 110 can be made of a variety of different. For example, the containers 110, 137 can be designed out of metal, plastic, glass, ceramic, among others, or a combination of these. The material used for the main container 110 can be a thermally conductive material for conduction of heat to the food product and liquid inside the container 110. In some embodiments, all or part of the main container 110 includes one or more surface treatments or coatings, such as a non-stick coating for easy removal of food product inside and easy cleaning. The main container 110 can also be removable or detachable from the apparatus 100 for separate cleaning or to be used as a serving container to be set on a tabletop or counter for serving the food product. The outer container 137 and/or main container 110 can further be designed to resist pressure and temperatures in the range of 5, 10, 15, 20, 25, 30 psi over the existing atmospheric pressure. At 15 psi (107 kPa) pressure boost relative to sea-level atmospheric pressure, for example, water boils at 122° C. (252° F.) and cooking times are reduced up to 70% while preserving nutrients and coloration of food to be cooked. The outer container 137 and/or main container 110 can also be designed to resist the escape of liquids and of gases (other than through a gas outlet or other gas release mechanism in one or both containers 110, 137). One or both of the containers 110, 137 can include an openable and closable lid or other cover, such as lid 105 of main container 110. The lid can include a seal to prevent undesired fluid escape. The lid can be a lock-top lid, hinged lid possibly with lock or latch, or other design. In some embodiments, the outer container 137 is a stand or other body that that connects and holds up container 110, 132, 134, without actually covering or fully covering any of them.

The outer container 137 and main container 110 can also be designed in various sizes. The size dimensions can include the largest dimensions (for example width, height, length, or diameter) of 75 cm, 60 cm, 50 cm, 40 cm, 30 cm, 20 cm, 15 cm, 10 cm, 5 cm, or larger or smaller as appropriate. The main container 110 can be designed to hold a specified amount of content, such as 2 cups, 4 cups, 8 cups, 10 cups 15 cups, 20 cups, 30 cups, or larger or smaller as appropriate. It can be designed to hold a specified number of servings of food, including 1, 2, 3, 4, 5, 6, 8, 10, 15, 20, 30 or more or fewer servings as appropriate. In some cases, the main container 110 can simultaneously hold a specified amount of food product (e.g., at least one portion, such as 50 mL), and a specified amount of liquid (e.g., 3-5 times the amount of food, such as 150-250 mL or more). In some embodiments, the liquid inlet container 134, liquid outlet container 132, and main container 110 have a maximum volume of at least 0.5, 1, 2, 3, or 4 liters, and in some cases the volumes are less than 10 liters. In many cases, food product, will expand when soaked. For example, beans may expand to 2-3 times their original weight or size when soaked, so the amount of soaking water can be controlled correspondingly, e.g., from 1, 1.5, 2, 2.5, 3, 3.5, 4, 4.5, 5, 5.5, or 6 times the amount of dry beans or ingredients. In multiple rounds of soaking, the amount of liquid added may be adjusted for the amount of the amount of expansion of the food, e.g. the amount of liquid added will be adjusted for the amount liquid already absorbed. The main container 110 can also include markings for measuring an appropriate amount of food product and/or liquid to add to the container. In many embodiments, the main container sizing will be increased by an appropriate amount to allow for measurement error, to contain overflow, etc., for example 1%, 2%, 4%, 5%, 10%, 20%, 50%, 100% or other percentage or fixed size (e.g. a fixed size of the specified % larger than the mentioned sizes) larger than the maximum recommended fill level 110 (FIG. 5) for food and liquid contents.

In one embodiment in which a 450 g (one pound) bag of dry beans equals about 6-8 portions of cooked beans (e.g., 3-4 cans of beans), and water will cover the beans by about 5 cm, which for 500 g of dry beans corresponds to a maximum of 12 dL of water (depending on container 110 shape). The same measurements apply for cooking water as with soaking water for beans (e.g., 12 dL cooking water). For rinsing of the beans (before or after soaking or cooking) or rinsing of the main container, about 6 dL of water can be used. These measurements produce approximately 6-8 portions of cooked beans. Thus, the container 134 holds about 3 L, the main container 110 holds about 2 L, and the container 132 holds about 1 L in this embodiment. In some embodiments, for the simplest design, the user can use the same amount of water no matter what type of food product and how much of the food is added. The simplest approach is to soak and cook in the maximum amount of water to remove the need to measure out specific amounts of soaking and cooking water. In some embodiments, temperature measurement is performed only for safety (to prevent boiling off all water, burning etc.). By adjusting the size and power of the heating element 131 to create a long-term simmer for the maximum amount of water and food, the need for cooking regulation of temperature is removed. In some embodiments, the apparatus is configured for rinsing the food product with liquid before soaking/cooking. In other embodiments, the user rinses the food product and the apparatus is configured to heat the food product when initially started in order to dry it.

In the embodiment of FIG. 1a, the liquid inlet/outlet 111 is protected by an outlet cover 118 that allows liquid to pass through without allowing larger particles (e.g., particles of food product) to pass through and into the liquid inlet/outlet 111. The outlet cover 118 can take on a number of forms or designs. For example, in one embodiment, the outlet cover 118 is a mesh, sieve, grid, or other filter that can prevent passage of most food particles while allowing the passage of liquid. The outlet cover 118 can contain a number of openings to allow passage of the liquid that can be sized according to use of the apparatus 100. For example, the openings of the outlet cover 118 can be, e.g. 0.01, 0.45, 0.5, 1, 2, 3, 4, 5, 6, 7, or 8 mm in diameter/cross section or larger or smaller as appropriate. In some cases, smaller openings or filtration may be appropriate, for example retaining particles above 0.5, 1, 2, 5, 6 10, 20, 30, 40, 50, 75, 100, 200, or 500 microns or larger or smaller. In one embodiment, the outlet cover 118 is a very fine mesh that allows only liquid pass through into the liquid inlet/outlet 111 and prevents passage of food particles above a certain size (e.g., appropriate ranges as provided above). In another embodiment, the outlet cover is a mesh or perforated cover that prevents larger, substantially whole food particles from passing, but allows smaller solid waste material, such as small stones or grit, sand, and other impurities to pass through to achieve retention of food with elimination of waste material.

The outlet cover 118 can be detachable, removable, or otherwise separate from the main container 110 to allow for changing between different outlet covers or to facilitate separate cleaning. The outlet cover 118 can be flat, concave, convex, conical or semi-conical, cylindrical (e.g., oblique-, trapezoidal-, or elliptic-cylindrical), semi-spherical, symmetrical or irregular, a section and/or combination of these shapes. In some embodiments the outlet cover 118 is raised, moved, rotated, or lowered in order to increase the surface area of the cover and/or to lessen clogging of the spout/drain. In some embodiments, the outlet cover 118 has few or no holes, and is raised, rotated, lowered, or otherwise moved to form an opening of sufficient size to retain desirable particles in the main container 110 while allowing other smaller or differently-shaped particles to drain from the main container 110. In some embodiments, the rate of draining is regulated to retain desired particles or remove undesired particles. In some embodiments, a slow rate of draining is used to limit the movement or removal of food particles.

In the FIG. 1a, the apparatus 100 includes valves to control liquid flow. The liquid inlet 115 has a liquid inlet valve 114, and the liquid inlet/outlet 111 has a liquid inlet/outlet valve 112. In some embodiments, only one of valves 112, 114 is present. The valves 112, 114 can be designed in various manners. For example, the valves 112, 114 can be designed out of metal, plastic, silicone, rubber, polymer, glass, graphite or composite materials, alloys, or combinations of these, among others. The size dimensions of the valves 112, 114 can be typically 20×40×80 mm, but this can vary depending on the desired embodiment's application. The two valves 112, 114 may be both designed in the same manner or may be designed differently for different functions (e.g., including different sizes, materials, etc.). Valve 114 and inlet 115 can be sufficiently large in this embodiment to allow throughput of liquid into the main container 110 in 0.25, 0.5, 1, 2, 3, 4, 5, 6 minutes or less.

The valves 112, 114 can take a variety of forms in different embodiments of the invention. In one embodiment, one or both of the valves 112, 114 is a cam shaft valve with a wheel that rotates into the pathway of the inlet 115 and inlet/outlet 111. In another embodiment, one or both of the valves 112, 114 is a ball valve, including a ball attached to inlet 115 and inlet/outlet 111, where the ball includes an opening and the ball can be rotated so that the opening is in line with the opening of the inlet/outlet (e.g., open configuration, to drain liquid) or the opening is out of line with the opening of the inlet/outlet (e.g., closed configuration, to prevent drainage of liquid). In another embodiment, one or both of the valves 112, 114 is designed with components on either side of the inlet 115 and/or inlet/outlet 111 to pinch a component in the inlet/outlet closed, or removing pinching to allow the inlet 115 and/or inlet/outlet 111 to be open. In some embodiments, one or both of the valves, or other valves in the invention, includes ball valves, reversible or other flap valves, piston valves, rotary valves, butterfly valves, multi-port valves, non-return or one-way valves, check valves, pumps, etc. In a further embodiment, one or both of the valves 112, 114 are designed with a flap resting against or within the inlet 115, inlet/outlet 111 that opens or closes the inlet 115 and/or inlet/outlet 111. The flap can be similar to a reversible flap valve or flap valve (e.g. toilet-bowel-flap-like) that pushes upward to close the tube. Similarly, the flap can be designed to be in a default closed state that then opens when liquid comes through. The valves 112, 114 can also be multi-port valves having more than one opening that allow liquid to pass into and/or out of the valve. The inlet 115 and inlet/outlet 111 can also be designed to be default state closed with a mechanism (valves 112, 114) that mechanically causes the inlet 115 and/or inlet/outlet 111 to open for flushing of liquid. In some embodiments, the valves 112, 114 can be used to regulate pressure inside the main container 110.

In some embodiments, the term "valve" can also include or mean a pump that moves the liquid by creating pressure. Thus, one or both of the valves 112, 114 can be a pump system that pumps liquid into or out of the main container 110. In some cases, a "valve" such as a liquid inlet valve can comprise a heat-driven pumping system with heater and valve, such as in a home drip coffee pot, and this liquid inlet valve may be used to push liquid from the inlet container 134, possibly controllably pre-heating the water leaving the liquid inlet container. In some cases, steam or other pressure will be used to push liquid into the outlet tube. Generally throughout this specification the term valve includes a pump, a valve, or a combination of these. For example, one of "valves" 112, 114 can be a pump, and the other a valve, even though both are generally called valves herein. In some embodiments, the valves 112, 114 can be designed to be non-backflow valves.

In some embodiments, the valve 112 at the inlet/outlet 111 is designed as a flap or other mechanism that covers the opening to the inlet/outlet 111 from the inside of the main container 110. In these embodiments, the valve 112 can function also as a gas outlet that allows gas to exit from the main container 110 and can keep gas inside the main container 110 to speed up the cooking process. The gas exiting the main container 110 may be steam created from the heating of the liquid in the main container 110. The valve 112 can be designed to be openable or closeable by the user, by a controller, via the pressure of liquid on the valve, via gravity, etc.

The liquid inlet 115 can be an open tube, but may also be a single-nozzle or multi-nozzle sprayer, mister, liquid atomizer, or other means to evenly or directionally distribute, spray, mist, and/or otherwise control the form of the liquid and location within the main container 110 where the liquid is delivered. For example, the inlet 115 can include a mister or sprayer to evenly spray or mist the bottom, walls, or surface of contents of the main container 110. In some embodiments, the inlet 115 can regulate the rate of delivery of liquid to the main container. For example, inlet for liquid can be designed to facilitate cleaning of the surface(s) of the main container 110, to facilitate sprouting, self-cleaning, to reduce or control foam, distribution of the food, to minimize splashing of the materials already in the container 110, to maintain a controlled temperature environment in the main chamber by regulating the rate of liquid delivery in conjunction with heating or cooling of the chamber, etc. Liquid can also be delivered from multiple locations, at a controlled rate, and/or through one or more nozzles. For example, part of the inner wall of the lid could be perforated, like a shower head, so the water can drop on much of the inner area of the pot.

In some embodiments, the valve 112 is a pressure release valve, and is designed to allow the apparatus 100 to function as a pressure cooker. In this case, the main container 110 can be a pressure vessel for cooking food products at a specified temperature (e.g., above 100° C.) and at an elevated pressure above atmospheric pressure. In some embodiments, both an automatic pressure-release valve and a controllable outlet valve are included. For example, these might be included in cases where a pressure-release valve provides a safety mechanism and a controllable outlet valve allows regulation of pressure within a safe pressure range. In some embodiments, the valve 112 is a cartridge or structure removable from the apparatus 100, and in some such cases the valve 112 is surrounded by a seal to substantially prevent gas from leaking around the edges of the gas outlet area.

The apparatus 100 can further include an air pump, fan, or passive opening ("air circulator") to allow for or regulate the circulation of air within the apparatus 100. The air circulator can be used to circulate air (e.g. hot or cool, stale or fresh air) into or out of the apparatus. The air circulator can be integrated within the valve 112, though in other embodiments it may share any or all of the noted characteristics of a gas outlet, but be physically separate. The air circulator can be integrated within the liquid inlet valve 114, or be a separate structure or separate insert into the lid 105. The lid 105, main container 110, and seals may be arranged prevent free circulation of air between the main container 110 and the outside atmosphere. Hence, the contents of the main container 110 may be substantially isolated from the outside atmosphere. However, controlled circulation or inlet of fresh air may be achieved by the use of an air circulator.

FIG. 1a also illustrates display 141, which can take various forms or locations. FIG. 1. shows possible location for the display 141, though the display could be placed on the top, bottom, side, nearby but by with wired, wireless, or network communication, etc., and there could also be multiple displays. The user can then enter various types of information into the display unit 141. For example, the user can enter information about the type of food product (beans, rice, vegetables, etc.) and the specific kind of that food product (e.g., black beans, pinto beans, etc.). In some embodiments, the user can enter one or more additional details, including the amount of food product (e.g., pounds, ounces, etc.) or a level of food product (e.g., marked by visible, physical markings inside the main container 110) or an amount of food product added (e.g., ½ cup, 1, 2, 3, 4, or 5 cups, etc.). The user can also enter timing data, such as when the food should be ready, when it was added, when the user will be home to check on it, etc. In some embodiments, the user can further enter different preparation or cooking cycles (e.g., sprouting, soaking, cooking, warming, etc. by applying a recipe to automate the corresponding process). The display unit 141 can include a keypad, web server, touchpad, WiFi or network connection with software API, or other mechanism for user manipulation, and a window, screen etc. for display to the user.

FIG. 1a also includes a control box 140 that can be located in various locations in the apparatus 100, including the location shown in FIG. 1. The control box 140 can be a microcontroller or other control mechanism that controls various components of the apparatus 100 and that can interact with the display 141 and a number of sensors S1-S5 shown in FIG. 1. The sensors S1-S5 can be a variety of different sensor types that can be located in various positions, such as those shown in FIG. 1a. There can be more or fewer sensors than are shown in FIG. 1a. The control box 140 and sensors S1-S5 are described in more detail below.

Referring now to FIG. 1b, there is shown a side view of the apparatus 100b, according to another embodiment. Like apparatus 100 of FIG. 1a, apparatus 100b of FIG. 1b includes an outer container 137b, a main container 110b (having a liquid inlet/outlet 111b with a liquid inlet/outlet valve 112b and an outlet cover 118b), a liquid inlet container 134b (having a liquid inlet 115b with a liquid inlet valve 114b), and a liquid outlet container 132b. In this embodiment, however, the containers 134b and 132b are differently shaped and are shown within the outer container 137b. These containers 134b and 132b can include handles 115b, 116b and spouts 113b, 117b. The outer container 137b is a chassis or other covering for various components of the apparatus 100, including the main container 110b. In brief summary, the main container 110b can be opened via the lid 105b to allow the user to insert food inside, such as dry beans (the outer container 137b can also having a lid or other access method to allow the user to access the main container 110b). The user adds fresh liquid (e.g., clean water from a tap) to the liquid inlet container 134b. The main container 110b is designed to rotate within the outer container 137b via cradle 102b to line up the tip 119b of the liquid inlet 115b with the liquid inlet/outlet 111b to receive fresh liquid from the liquid inlet container 134b (receiving position), and to line up the liquid outlet 115 with the opening 150b of the liquid outlet container 132b to deliver waste or used liquid into the liquid outlet container 132b (dump position). This rotation can be used repeatedly to add fresh liquid into the main container 110b to rinse, soak, cook, etc. the food in the container 110b, and then to dump the used liquid into the liquid outlet container 132b. The heater 131b heats the main container 110b, and the food and liquid inside, for cooking and other processes requiring heat. A control box 140b controls the operations of the apparatus 100b and a display 141b receives input from the user regarding programming, etc. of the apparatus 100b. Sensors S1-S5 correspond to sensors S1-S5 of apparatus 100b. This is just a brief description of the components of apparatus 100b. As explained above, the description of the corresponding components of apparatus 100 and apparatus 100c throughout also apply generally to the components of apparatus 100b.

Referring now to FIG. 1c, there is shown a front view of the apparatus 100c, according to another embodiment. Like apparatus 100 of FIG. 1a, apparatus 100c of FIG. 1c includes an outer container 137c and a main container 110c. The liquid inlet container 134 and liquid outlet container 132 are not shown (or can be contained within the components shown). The main container 110 is designed to rotate (as shown by the arrows in FIG. 1c) within the outer container 137c (or along with the outer container 137c) via cradle 102c. The heater 131c heats the main container 110c, and the food and liquid inside, for cooking and other processes requiring heat. A display 141c receives input from the user regarding programming, etc. of the apparatus 100c. The apparatus 100c can also include any of the additional components described throughout with regard to apparatus 100a or 100b, as well. This is just a brief description of the components of apparatus 100c. As explained above, the description of the corresponding components of apparatus 100 and 100b throughout also apply generally to the components of apparatus 100c.

B. Rear View and Rotation Components

Figure 2:
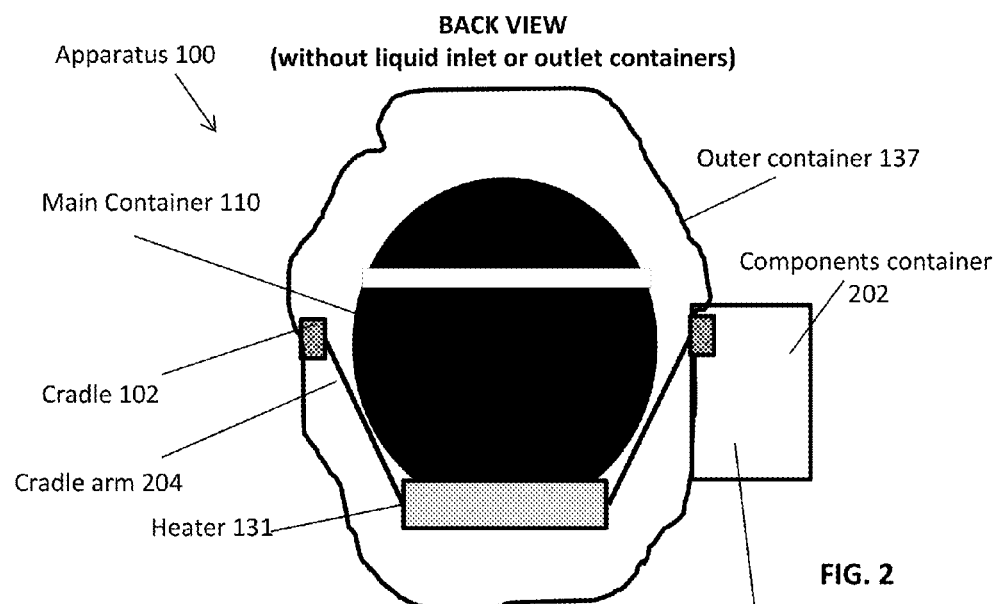
FIG. 2 is a rear view of the liquid movement and control apparatus without the liquid inlet or outlet containers, according to embodiments of the invention.

Referring now to FIG. 2, there is shown a rear view of the apparatus 100 without the liquid inlet container 134 or liquid outlet container 132, according to some embodiments. This view shows the cradle 102 with cradle arms 204 on either side of the main container 110. The heater 131 forms the base of the cradle 102 on which the main container 110 sits. The cradle 102 acts a swing with the two cradle arms 204 connecting on either side to the outer container 137 or to another part of the apparatus 100. The point at which the two arms 204 connect to the apparatus 100 is the pivot point about which the main container 110 can be rotated within the outer container 137. In some embodiments, the main container 110 is designed to snap into or otherwise be attached to the heater 131 when the container 110 is positioned in the cradle 102 to keep the container 110 within the cradle 102 during rotation. The cradle 102 can be designed to allow the main container 110 to pivot backwards about the rotation point to line up the liquid inlet/outlet 111 (or teapot spout) with the liquid inlet 115 of the liquid inlet container 134 so that liquid from the container 134 can enter the main container 110 (see FIG. 4). The cradle 102 can also be designed to allow the main container 110 to pivot forward about the rotation point until the liquid inlet/outlet 111 is positioned just above the liquid outlet container 132 to allow the liquid inside the main container to exit into the liquid outlet container 132 (see FIG. 5). The cradle 102 can also allow the main container 110 to rotate to other positions in the outer container 137 as well (e.g., to rotate backwards, past the liquid inlet 115 to another opening or container, such as a spice holder).

Besides the cradle 102 design illustrated, other rotation mechanisms for moving the main container 110 can also be used. Referring now to FIG. 3b, there is shown a rear view of the liquid movement and control apparatus without the liquid inlet or outlet containers and with a support 380 but without a cradle 102, according to embodiments of the invention. The one or more supports 380 connect the main container 110 to the outer container 137 and/or the components container 202/motor 302. The main container supports 380 can take a variety forms, such as an axle, pins, rods, knobs, wheels, gears, or other attachment points that connect the main container 110 to the apparatus 100, including to the components container 102, to the motor 302, or other points on the main body of the apparatus 100. For example, the sides of the main container 110 can have knobs that stick out and rest on or attach to the apparatus 100, possibly including gears, teeth, grooves, etc. These thus support the weight of the main container 110 and also potentially connect the main container 110 the motor 302 via gears, shafts, belts, etc. In some embodiments, the main container 110 includes one or more round surfaces suitable for rolling, and in some such cases the main container 110 rests on top of wheels, rollers, belts, gears, etc. If one or more of these rotating "wheels" are part of the apparatus 100, the turning of those wheels by a motor in the apparatus will rotate the main container 110. In many cases, with a cradle, the heater 131 is part of the cradle and the heater moves with the cradle. However, the heater 131 can be fixed to the apparatus 100. Similarly, the heater 131 can be integrated into the main container 110, such as a coil integrated into the main container 110 and in electrical contact with the apparatus via the attachment points in the container supports 380. In cases where the heater 131 moves with the main container 110, energy can be supplied by contacts that are open when the heater is in a non-heating position, and the contacts can be closed to form a circuit when the heater is in one or more heating positions. In some cases, the default position of the main container 110 is a heating position. In some cases, rotating the main container 110 to add or remove liquid breaks the circuit to the heater 131, e.g. placing the main container 110 in a non-heating position so that the heater is inactive by, for example, breaking the electrical circuit to the heater.

The components container 202 is also illustrated in FIG. 2 which contains mechanical and other components for operating the apparatus 100. That container 202 is shown for illustration on one side of the main container 110, though it may be on both sides, below, surrounding, comprised of several distinct containers, or otherwise situated in relation to the main container 110. For example, the components container 202 can have one or two motors 302 that drive the rotation of the main container 110, possibly driving the rotation from either or both sides of the main container 110 (e.g. rotating a cradle or axle from one or both sides of the main container 110).

Figure 3A:
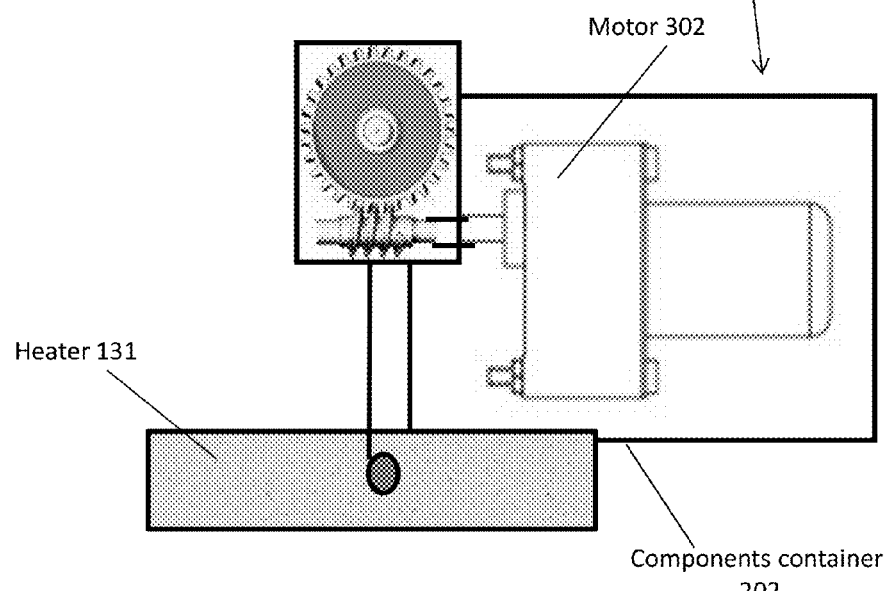
FIG. 3a is a side view of the components container and heater of the apparatus, according to embodiments of the invention.
Figure 3B:
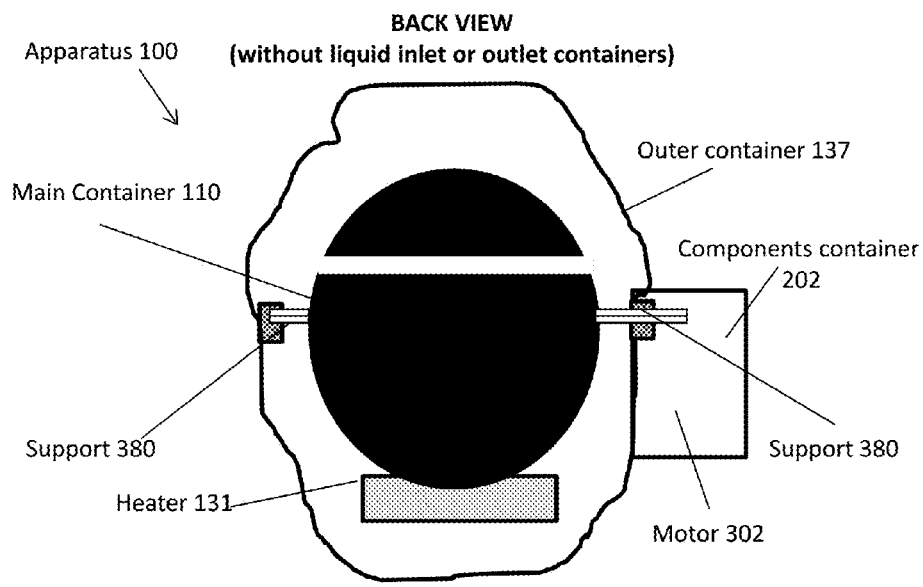
FIG. 3b is a rear view of the liquid movement and control apparatus without the liquid inlet or outlet containers and with a cradle-less support, according to embodiments of the invention.
Figure 3C:
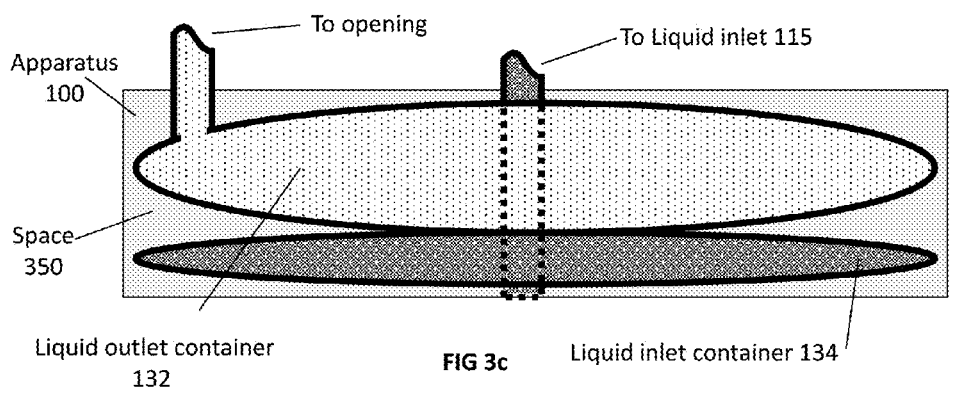
FIG. 3c is a side view of the liquid outlet container with a double-bladder design, according to embodiments of the invention.
Figure 3D:
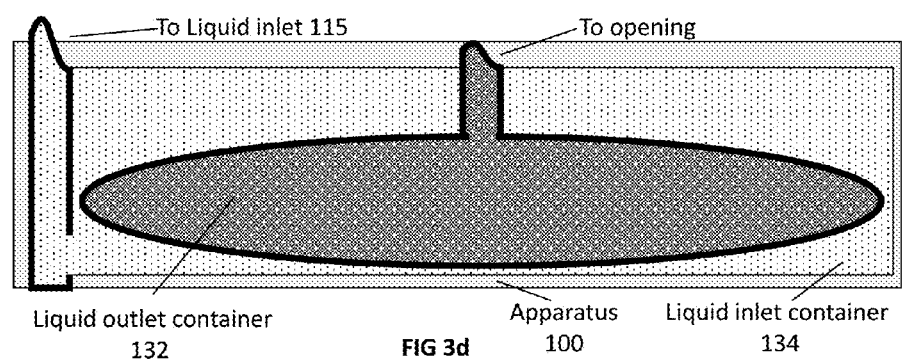
FIG. 3d is a side view of the liquid outlet container with a single-bladder design, according to embodiments of the invention.

Referring now to FIG. 3a, there is shown an enlarged view of the components container 202 of the apparatus 100, according to some embodiments. The components container 202 contains the motor 302 for operating the apparatus 100 and rotating the main container 110. A variety of different motor designs can be used as motor 302 (e.g., a stepper motor, a simple grill or barbecue motor with some position switches that could be magnetic or otherwise, etc.).

C. Receiving Position

Figure 4:
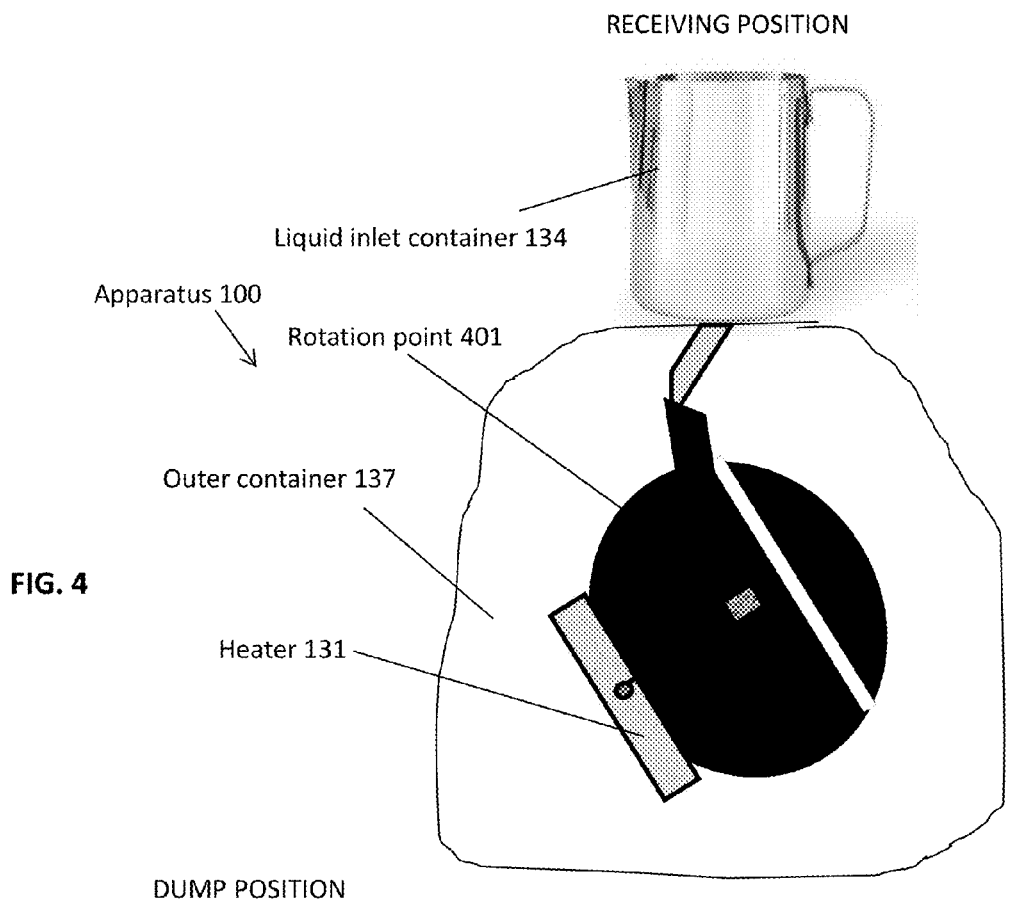
FIG. 4 is a side view of the liquid movement and control apparatus in the receiving position with the liquid inlet container, according to embodiments of the invention.

Referring now to FIG. 4, there is shown a side view of the apparatus 100 in the receiving position with the liquid inlet container 134, according to an embodiment of the invention. In this Figure, the main container 110 has rotated around rotation point 401 to position the liquid inlet/outlet 111 of the main container 110 near or directly under the liquid inlet 115 of the liquid inlet container 134 receiving liquid from the liquid inlet container 134 into the main container 110. The cradle 102 has swung forward (or to the left in FIG. 4) to rotate the main container 110 around rotation point 401 until the liquid inlet/outlet 111 is pointing upward in the apparatus 100. In some embodiments, the liquid inlet/outlet 111 and the liquid inlet 115 can snap or otherwise fit together for liquid transfer between the containers 134, 110. The liquid can be added to the main container 110 at multiple points in the food preparation/cooking process. For example, the liquid can be added for rinsing the food, for soaking the food, for cooking the food, for running a self-cleaning cycle through the main container 110 to clean the inside, etc.

Various mechanisms can be used for controlling the movement of the main container 110 and for stopping it at the correct receiving position for collecting the liquid from the container 134. Using the motor 302, the main container 110 can be rotated to specific positions. In some cases the apparatus 100 will determine the position of the main container 110 by the amount of rotation applied. In other cases, the position can be determined and/or controlled by sensors, such as contact switches, that provide a signal when the container 110 is in specific positions. The amount of force or change in amount of force to rotate the main container 110 can be measured by and used by the apparatus 100 to determine the position of the main container 110. This is particularly true when the main container 110, or its center of mass, is asymmetrical around the rotational axis, and hence requires different amounts of force to rotate to or maintain different positions. In some cases, position-dependent switches such as contact switches will be activated at pre-determined main-container positions (e.g. receiving/liquid-inlet position, dump/liquid outlet position, spice-hatch #1 activation position, spice-hatch #2 activation position (see description of spice-hatches below), etc.). Feedback from those switches can cause the rotation to pause or stop at that location when appropriate.

The valve 114 of the liquid inlet container 134 can be designed to open when the main container 110 has reached the receiving position of FIG. 4 to release the liquid from the container 134. As one example, the valve 114 can be designed as a liquid dispenser (e.g., similar to that used with a soda machine or water cooler) where the main container 110 or some structure on the main container 110 (e.g., the liquid inlet/outlet 111 or another structure on the surface) presses against a bar, switch or other control mechanism that causes the valve 114 to open and dispense liquid. Other designs are also possible. For example, valves may be opened or closed by mechanical action of the rotation of the main container 110, or by the controller 140, or by a combination of the two. The outlet cover 118 (see FIG. 1*a*) has openings that allow the liquid to drain though the outlet cover 118 though the liquid inlet/outlet 111, and into the main container 110.

D. Drainage/Dump Position

Figure 5:
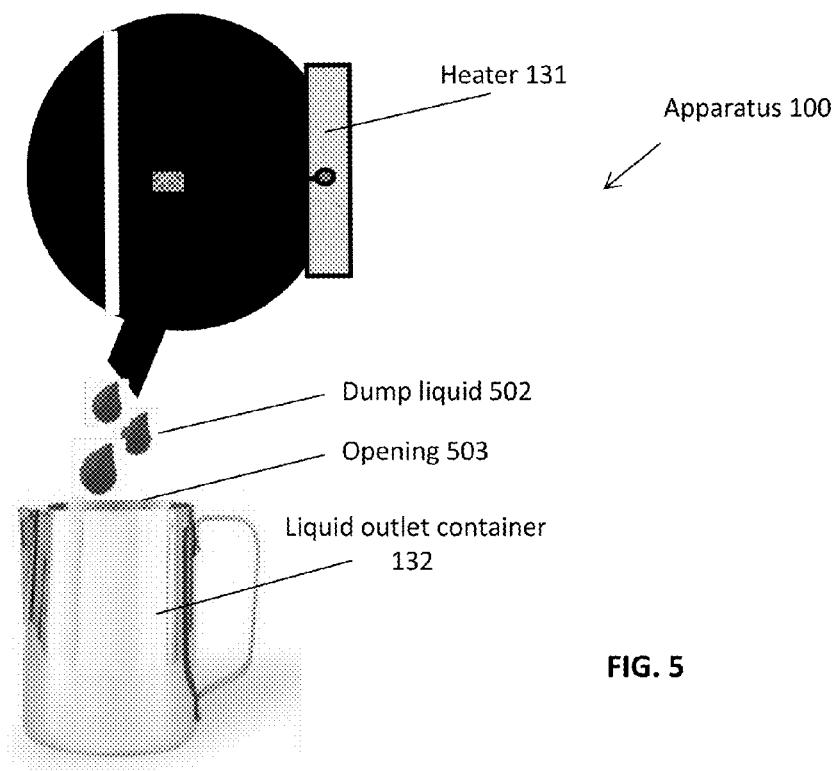
FIG. 5 is a side view of the liquid movement and control apparatus in the drainage/dump position with the liquid outlet container (outer container not shown), according to embodiments of the invention.

Referring now to FIG. 5, there is shown a side view of the apparatus 100 in the drainage/dump position with the liquid outlet container 132 (outer container 137 not shown), according to some embodiments. In this Figure, the main container 110 has rotated around rotation point 401 to position the liquid inlet/outlet 111 at an opening 503 of the liquid outlet container 132. The cradle 102 has swung backward (or to the right in FIG. 5) to rotate the main container 110 around rotation point 401 until the liquid inlet/outlet 111 is pointing downward in the apparatus 100. The dump liquid 502 is shown exiting the main container 110. The liquid inside the main container 110 can be dumped at multiple points in the food preparation/cooking process. For example, the liquid can be dumped after rinsing the food, after soaking the food, after cooking the food, after running a self-cleaning cycle through the main container 110 to clean the inside, etc.

Various mechanisms can be used for controlling the movement of the main container 110 and for stopping it at the correct drainage/dump position for releasing the liquid from the container 110. Commonly, these are similar to the methods described for stopping at other positions (e.g. the receiving position described above).

In embodiments in which the main container 110 has a valve 112, the valve 112 can be designed to open when the main container 110 has reached the drainage/dump position of FIG. 4 to release the liquid from the liquid inlet/outlet 111. Commonly, this similar to as described throughout this description for opening, closing, or controlling valves. The outlet cover 118 (see FIG. 1*a*) can be a mesh, sieve or other structure with openings that allow the liquid to drain though the outlet cover 118 and out of the liquid inlet/outlet 111. However, the openings of the outlet cover 118 are fine enough to keep the food inside the main container 110 (or at least the larger pieces of food, e.g., the beans). When the main container 110 is in the drainage/dump position and the valve 112 is open, the liquid in the container 110 leaves the container 110 via gravity through the outlet cover 118 and the inlet/outlet 111, while the cover 118 catches the food and prevents its exit from the main container. The apparatus 100 can be designed so that all or a portion of the liquid leaves the main container 110 in the drainage/dump position, or could have different settings that allow for different amounts of the liquid to be released, by having different dump positions, by using the valve 112 to control the amount of liquid exiting the container 110, and so forth.

E. Heating and Power Components

Figure 6:
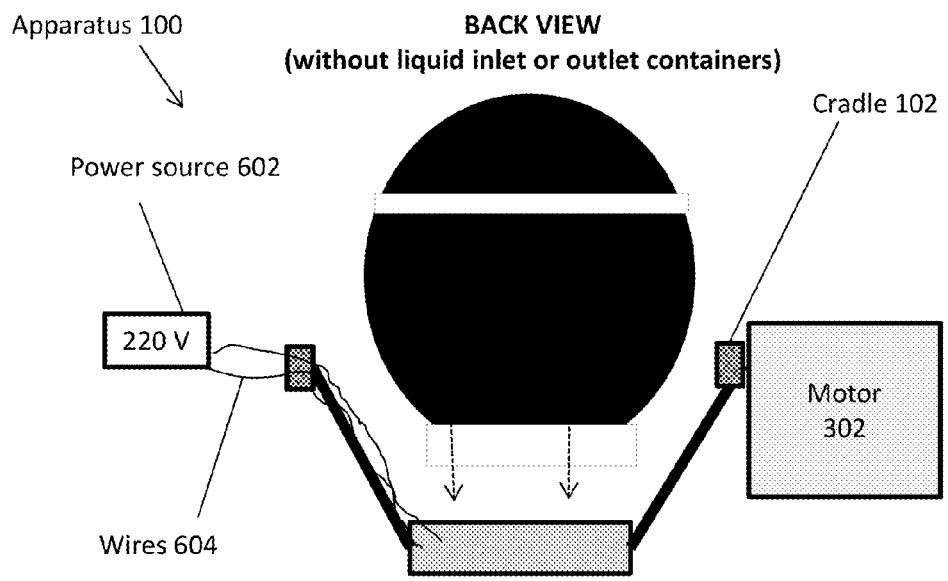
FIG. 6 is a rear view of the liquid movement and control apparatus with the main container being positioned into the cradle (outer container not shown), according to embodiments of the invention.

Referring now to FIG. 6, there is shown a rear view of the apparatus 100 with the main container 110 being lowered into the cradle 102 (outer container 137 not shown), according to some embodiments. The apparatus 100 is connected to a power source 602 via wires 604. The apparatus 100 can be designed to work with 220V, 50 Hz or 110V, 60 Hz, batteries, or other power sources. In some embodiments the apparatus 100 will prevent the heater 131 from activating when the main container 110 is not present with, for example, an optical sensor that sees the container 110 or detects loss of light due to the presence of the main container 110, a switch closed by the weight of the main container 110, a conductive or inductive sensor, etc.

Figure 7:
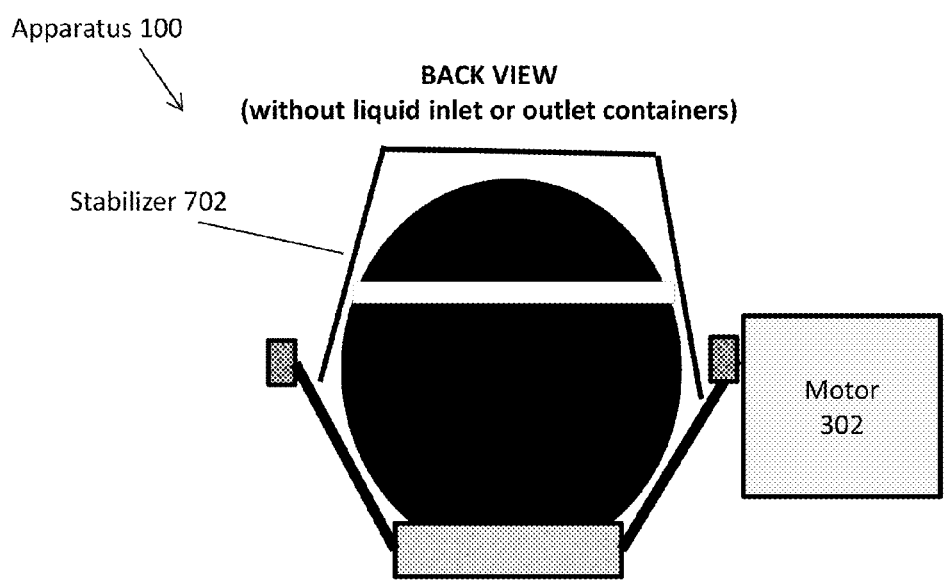
FIG. 7 is a rear view of the liquid movement and control apparatus with the main container in the cradle and with the stabilizer holding it against the heater (outer container not shown), according to embodiments of the invention.

Referring now to FIG. 7, there is shown a rear view of the apparatus 100 with the main container in the cradle and with a stabilizer 702 holding it in place during rotation, and holding it against the heater 131 (outer container 137 not shown), according to some embodiments. In other embodiments, the main container 110 can be held in place by a latch, lock, magnet, etc. serving as a stabilizer. In some embodiments, the stabilizer 702 primarily constrains the movement of the main container 110 within a predetermined region during rotation (e.g. to keep it from falling out of the cradle or moving out of position in the apparatus 100 while the main container 110 is rotated).

The rotating main container 110 design has a number of advantages. First, it is a simple and clean cooking container design. Second, there is no need or a limited need for complicated valves or for hoses and other structures attached to cooking container that must be designed to tolerate dishwashing. Third, the main container 110 is removable for washing by hand or in a standard, home dishwasher and can be designed to be used as a serving container that will stand flat on a table with no structure underneath. Fourth, the rotating motion can empty the main container 110, but also can fill it water and release spices, so there is no need for additional electromechanical gadgets to fill it with water and to release spices. These are just a few examples of advantages of the apparatus 100.

F. Microcontroller and Sensors

Referring again to FIG. 1*a*, the apparatus 100 includes a control box 140 that can be connected to a key pad associated with a display unit 141, and that can also be connected to a various sensors S1-S5 in multiple sensor locations. In some embodiments, a keypad will be understood to include the idea of a voice control unit, a mouse or touchpad device, a touch-sensitive screen, a control unit connected over a network, or any of the other user input means known in the appliance or mobile device fields.

The sensors can be sensors of variety of types, including temperature sensors, weight sensors, pressure sensors, optic sensors, liquid level sensors, liquid flow sensors, ultrasonic sensors, infrared sensors, edibility or cooking status sensors (ECS sensors), scales or weight sensors, piezoelectric sensors, clocks or time sensors, infrared (IR) sensors, barcode sensors, RFID sensors, pH sensors, conductance or capacitance sensors, liquid or atmospheric pressure sensors, imaging sensors, cameras providing an image of the inside of the main container, mechanical sensors to determine the viscosity or resistance to stirring in the main container, voltage or current or energy usage sensors, or combinations of these or other sensors, or others. For example, sensor S1 can be a temperature or weight sensor. Sensor S2 can be a temperature sensor or a special ECS (i.e. suitability for eating; edibility, or cooking status) sensor. Sensor S3 can be a temperature, pressure, liquid level, or optic sensor observing the food product, and can be located inside or outside the main container 110. Sensors S4 and S5 can be liquid level sensors or temperature sensors. The embodiment of FIG. 3 illustrates five sensors, though there can be more or fewer sensors as needed, which can be in the same locations or in other locations not illustrated in FIG. 1*a*. In addition, some sensors can be designed to have more than one function or include more than one sensor type.

One or more of sensors S1-S5 or other sensors not shown can assist in safety management for the apparatus 100. For example, a sensor in the liquid outlet container 132 can warn a user if liquid is left in the container 132 that should be removed. A sensor in the main container 110 can warn if the cooking container gets too hot (e.g., the liquid boils off), if there is a fire, if the apparatus 100 is accidentally tipped over (e.g., accelerometer), whether the lids are properly locked or in place for the containers 110, 137, etc., if there is insufficient liquid in the liquid inlet container 134, if a motor overload is experienced, and so forth.

The control box 140 or other microcontroller controls operation of the components of the apparatus 100. It can automatically open and close valves 114, 112, control the motor and rotation of the main container 110, control the heater 131, etc. In one embodiment, the program automatically rotates the container 110 into the receiving position and opens valve 114 to supply the right amount of water from the liquid inlet container 134 into main container 110 to properly rinse, soak, or cook a food product. Upon arriving at the proper or desired water level in the main container 110, the microcontroller can order the valve 114 to close. When the soaking cycle is completed, the microcontroller can control the rotation of the container 110 into the drainage/dump position, opening and closing of valve 112, and release of the liquid from the container 110. The controller 140 can control the heater 131 to start operating according to a particular common recipe-stage or heating cycle. When the heating cycle is completed, the controller 140 can order the heater 131 to enter a special cycle that keeps the main container 110 contents warm.

In some embodiments, one or more recipes are stored on a computer-readable storage medium (e.g., a flash memory, RAM, ROM, disks, etc.) that stores instructions (e.g., computer program instructions) that can be executed by a computer processor for operating the apparatus according to the recipe. Thus, there can be recipes for preparing different food products (e.g., beans, rice, etc.) or different types of food products (e.g., black beans, pinto beans), and so forth. The recipe can specify the appropriate temperatures, lengths of time, quantities of food product or liquid, etc., and can the controller 140 can operate the device according to the directions specified in the recipe. In the embodiment of FIG. 1a, the control box 140 allows interaction with the user through the key pad associated with a display unit 141. The user can enter information in order for the control box 140 to be able to compute and execute the desired operation, and the sensors can aid in achieving the desired operation by informing the controller 140 of the conditions inside the apparatus 100.

G. Input Reagents and Seasonings

FIGS. 8a-d illustrate the spice hatch 800 or seasonings container, according to some embodiments. FIG. 8a is a side view of the lid 105 of the main container 110 with a single spice hatch. The spice hatch 800 is a cup, chamber, repository, or seasonings holder, where liquid or dry seasonings or other reagents ("spices") can be added and then released into the main container 110 or into the fresh water/liquid inlet container 134. The user can access the spice hatch 800 by opening the lid 105 of the main container 110 and by opening the lid 802 of the spice hatch 800 to insert spices into the spice hatch 800. The release of spices into the main container 110 can occur by simply opening the lid 802 on the spice hatch 800 once the lid 105 of the main container 110 is closed to expose the spice hatch 800 contents to the main container 110. In some embodiments, opening a mechanical hatch, flap, door, or lid 802 can drop or slide the seasonings into the main container 110, (e.g. a "trap door" mechanism). Lid seal 804 seals the spices inside the spice hatch 800. Lid retainer 808 is a latch, hook, pull, spring, or other standard mechanical method that holds the lid 802 in place to trap the spices inside the hatch 800. The spice hatch 800 can be fully or partially removable for loading and cleaning.

Spice release control 806 controls the opening of the lid retainer 808, which allows the spices to be released into the inside of the main container 110. Various different control 806 mechanisms can be used. For example, the spice hatch 806 can be opened by means of an permanent magnet or electromagnet that does not require a physical connection to the inside of the main container 110, and which can be activated to release the lid 802 of the spice hatch 800. In general, such a spring/magnet mechanism, a motor, a slider, a valve, and many other means well known in the appliance arts can be used to implement the spice release control 806. In some cases, the spice hatch 800 has a lid 802 that opens at a pre-determined temperature or pressure.

The spice hatch 800 can be designed such that opening the hatch 800 to the main container 110 allows appropriate transfer of seasonings into the main container 110. For example, steam or steam condensation could be enough to dissolve, liquefy, melt, or solvate seasonings 600 and thereby allow them to flow into the main container 110. Similarly, seasonings 600 can be formulated such that they are solid or viscous at room temperature and humidity, but liquefy or gasify on exposure to the main container 110 and thereby flow or release into the main container 110. The lid 802 isolates the seasonings from the main container environment and keeps the seasonings ready for use until the appropriate point in the cooking process for spice addition to the food product. Salt, for example could be placed in the spice hatch 800 and added late in the final cooking step to facilitate full flavor when cooking food products like beans in order to achieve desired flavor without causing tough skins on the beans. Chili and hot spices that the operator wanted to penetrate vegetables or beans could be added to the spice hatch 800 and then controllably exposed to the main container 110 earlier in the cooking process to soak them deeply into the food. Baking soda or Beano could be added to the seasonings holder 600 and then exposed to the main container 110 during a pre-rinse-soak step to neutralize flatulence-inducing nutrients, and yet be substantially eliminated in a rinsing cycle. Hydrophobic coatings, and other easy cleaning materials, may be applied to the spice hatch 800 to keep charged or hydrophilic materials from sticking to the spice hatch 800.

In some cases, the spices added to the spice hatch 800 are contained in a pre-filled canister, packet, or single-use container or spice package that can be used to add a pre-determined mixture of seasonings. For example, in some embodiments, the seasoning package is sealed prior to use, and is punctured by the apparatus to allow fluid flow into and out of the package to transport the seasonings into the main container. In some cases, the seasonings are delivered by controllably flowing liquid through the spice hatch 800 at the desired time or in recipe conditions when the time is right to add some or all of the spices to the main container 110. Commonly, spice packages having pre-mixed liquids or seasonings can be added to a main container 110 by the flow of a carrier liquid, such as water, to flush them into the main container 110 from a pre-prepared reagent container. Reagents, such as salt or salt-water, baking powder or baking-powder infused water, vinegar, and other reagents known to aide in food preparation, can be kept separately from the main cooking or rinsing water. The spices used can be liquid, paste, powder, infusible materials like tea, coffee, saffron, or bay leaves, etc.

FIG. 8b is a rear view of the lid 105 of the main container 110 with two spice hatches. The two spice hatches 800a and 800*b* each contain all the components of the single spice hatch 800, but they are labeled "a" and "b" to represent corresponding components. A number of additional spice hatches 800 can be included. The various spice hatches can be independently controllable for releasing different spices at different points in the cooking process, or to contain seasonings that need different types of containers for practical handling reasons (e.g. dry spices that mix poorly with liquid seasoning oils). Multiple magnets or mechanical controllers can be included that allow the hatches 800 to be opened or closed independently, e.g., by controlling the opening and/or closing of lids 802*a* and *b*. In some cases, one or more seals 804*a* and *b* can be used to provide a liquid, solid, or gas tight seal. In some embodiments, the sensors can be used to sense some or all of the following: the presence or level or type of seasonings present in the spice hatches 800 *a* and *b*, the rate of inflow of liquid or outflow of liquid or seasonings, the freshness, expiration date, or vendor of the seasonings or seasonings container, to confirm if an inner or outer lid is open or closed partially or fully, to determine if the seasonings or seasonings package present is in accordance with a recipe to be performed by the invention, or to determine a recipe to be performed based on a machine-readable label 620, e.g. a RFID tag, signature, barcode, data-matrix code, semacode, data glyph, code, tag, other machine-readable label, or other measurement of the seasonings or seasonings package, etc.

FIG. 8*c* is a side view of the spice hatch 800 release. FIG. 8*d* is a side view of the spice hatch 800 after release. The main container 110 can be rotated backwards in the outer container 137 past the liquid inlet 115 to cause the spice hatch opening. Where the position of the main container 110 in FIG. 1*a* is position A (the normal, horizontal position, 0°), the position in FIG. 4 is position B (the filling or receiving position, 30°), the position in FIG. 5 is position C (the emptying or dump position, −90°), then the spice release position can be Position D (60°).

For example, as shown in FIGS. 8*c* and *d*, the spice release control 806 can engage a lid release activator 810 (e.g., a switch, lever, outcropping, etc.) in the outer container 137 that causes the lid 802 to come open to release the spices. Where there are multiple spice hatches 800, there can be multiple lid release activators 810 in the outer container 137. The rotation of the container 110 back forwards will allow the spices to slide further into the container 110 to mix with the food product and liquid in the container 110. A variety of other release activation mechanisms can also be used to open the lid 802.

The spice hatch is shown in FIGS. 8*a-d* in the lid 105 of the main container 110 though it could also be located in other places within the main container 110 or in the outer container 137, in a handle of the main container 110, etc., according to other embodiments. As one example, the spice hatch 800 could mechanically open at a certain rotation angle of the main container 110. The main container could be designed to rotate backward, similar to what is shown in FIGS. 8*c* and *d*, but instead the spice hatch 800 would be in the outer container 137. In this case, the spice hatch 800 can open when the liquid inlet/outlet 111 is positioned directly under the spice hatch 800 to allow the spices to enter through the inlet/outlet 111. The opening of the hatch 800 can be trigged by the container 110 hitting a switch, mechanical lever, or other control mechanism on the outer container 137. In some embodiments, after the spices are released into the inlet/outlet 111, the main container can rotate past the liquid inlet of container 134 and liquid can be released into the inlet/outlet 111 to wash the spices into the main container 110.

H. Liquid Inlet/Outlet Valve

FIGS. 9*a* and 9*b* illustrate a side view of the liquid inlet/outlet 111 with the liquid outlet valve 112 on the inside of the main container 110, according to some embodiments. The tip of the inlet/outlet 111 is shown to the left side of the Figures while the part of the inlet/outlet 111 that connects to the main container 110 is shown on the right side of the Figures. FIG. 9*a* is a side view of the liquid outlet with a closed outlet valve on the inside of the main container. FIG. 9*b* is a side view of the liquid outlet with an open outlet valve on the inside of the main container. The valve 112 in this embodiment is a flap that closes over the liquid inlet/outlet 111 from inside the main container 110 to prevent the release of liquid or steam from the main container 110. The outlet cover 118 is shown on the outside of the valve 112. A seal 904*a* is shown on the outside of the valve 112 flap to seal the opening of the liquid inlet/outlet 111. A controller 902*a* can control the opening and closing of the valve 112.

In some cases, the valve 112 can be simply opened and closed by a stationary or pivoting (fixed) rod 912 attached to the apparatus 100 that passes through the liquid outlet 111, outlet cover 118, and pushes the outlet valve open. In some cases, such a rod is attached to the main apparatus 100, e.g. to the outer container 137, and is positioned so that rotating the main container 110 to the dumping position also moves the liquid outlet valve 112 into contact with the rod, and thus pushes the liquid outlet valve 112 open. In some cases, the seal is a soft, food-safe high-temperature silicone seal. Although the controller 902*b* (optionally including a hinge), is shown on top of the outlet 111, it can also be below, on the side, integrated into the body of the main container 110, etc. The controller 902 can also incorporate catches, triggers, arms, and other mechanisms to open or close the valve 112. In some cases, it will be designed to interact with a corresponding catch, trigger, arm, knob, etc., on the outer container 137 or apparatus 100 so that simply rotating the main container 110 will control the opening and/or closing of the valve 112. The controller 902 can also comprise a spring, magnet, catch, or other mechanical mechanism to maintain normally-closed (or open, or bi-positioned) positioning of the valve 112. In some embodiments, controller 902 will open the valve 112 only when the main container 110 is in specific, pre-determined positions, such as the dumping position, the liquid receiving position, one or more positions for receiving spices, such as during spice hatch release, and so forth.

FIGS. 9*c* and 9*d* illustrate a side view of the liquid inlet/outlet 111 with the liquid inlet/outlet valve 112 on the outside of the main container 110, according to some embodiments. The tip of the inlet/outlet 111 is shown to the left side of the Figures while the part of the inlet/outlet 111 that connects to the main container 110 is shown on the right side of the Figures. FIG. 9*c* is a side view of the liquid outlet with a closed outlet valve on the outside of the main container. FIG. 9*d* is a side view of the liquid outlet with an open outlet valve on the outside of the main container. In this embodiment, the valve 112 is a flap that closes over the liquid inlet/outlet 111 from outside the main container 110 to prevent the release of liquid or steam from the main container 110. The outlet cover 118 is shown on the inside of the liquid inlet/outlet 111. A seal 904*b* is shown on the inside of the valve 112 flap to seal the opening of the liquid inlet/outlet 111. A controller 902*b* controls the opening and closing of the valve 112. In some such designs, the steam from inside the main container 110 can put pressure on the valve 112 flap to push it open for release as a pressure safety mechanism.

FIG. 9e is a side view of the valve being opened by a valve opening structure 910 on the outer container 137, according to some embodiments. The structure 910 can be a latch, switch, outcropping, etc. in the outer container 137 that engages or otherwise causes the valve 112 flap to open for releasing liquid or steam from the main container 110. The structure 910 can be positioned adjacent to the liquid outlet container 132 to cause the flap to open when the main container 110 reaches the drainage/dump position for dumping of waste liquid.

II. Method

A. User Method

Figure 10:
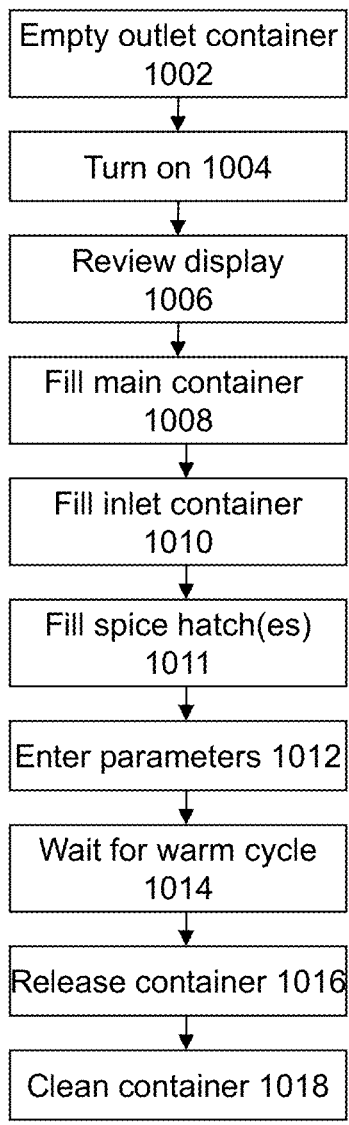
FIG. 10 is a flowchart illustrating steps performed for the user method of operating the apparatus, according to embodiments of the invention.

Referring now to FIG. 10 there is shown a flowchart illustrating the user method of operation of the apparatus 100, according to some embodiments of the invention. The user empties 1002 the container 132 and places it back into position inside the apparatus 100. The user turns power on 1004, reviews 1006 the display to make sure the display shows the start message (e.g., "SELECT BEANS RECIPE"), and opens the lid 105 to container 110. The user fills 1008 container 110 with the food product to the correct level (e.g., as determined by a line on the inside of container 110 or by a sensor, etc. (e.g., about 2 cups (4 dL)), closes the lid 105 to container 110, fills 1010 the container 134 to the line with fresh liquid (e.g., about 10 cups (2 L)), and in some embodiments, the user fills 1011 one or more spice hatches. The user can make sure the display still displays the start message. Steps 1008, 1010, and 1011 can occur in any order. The user enters the parameters for the apparatus 100. For example, the user can select 1012 the particular food product on the display, confirms, and the message on the display 141 shows the food (e.g., "BLACK BEANS"). As another example, the time symbol (e.g., "00 00") can appear on the display, and the user can set 1012 the desired eating time (e.g., in hours and minutes from the time right now) by adjusting the time on the display 141. The user can confirm any or all settings. One or messages will be displayed for the cycle (e.g., "BLACK BEANS"+"RESTING"+"16 30", which is the time left to the end, in this example 16 hours and 30 minutes). Once the timer counts down to zero, the apparatus 100 can switch to low-heat mode to keep the meal warm for up to several hours, and the display can indicate this (e.g., "COOLING aa bb", where aa bb is the time since the low-heat mode was entered). The user can wait 1014 until the display indicates this cycle (e.g., "LOW HEAT aa bb"), which indicates that container 110 is sufficiently cooled off to be removed. The user can open the lid 105 to container 110 and release 1016 the container 110 from outer container 137. The container 110 can then be used as a serving dish. Afterwards, the container 110 can be washed 1018 and one or more components placed in the dishwasher. The user can also put the container 110 back into the apparatus to run a cleaning cycle 1018. This is just one example of steps that can occur in the method, though more, fewer, or different steps can occur.

B. Apparatus Method

Figure 11:
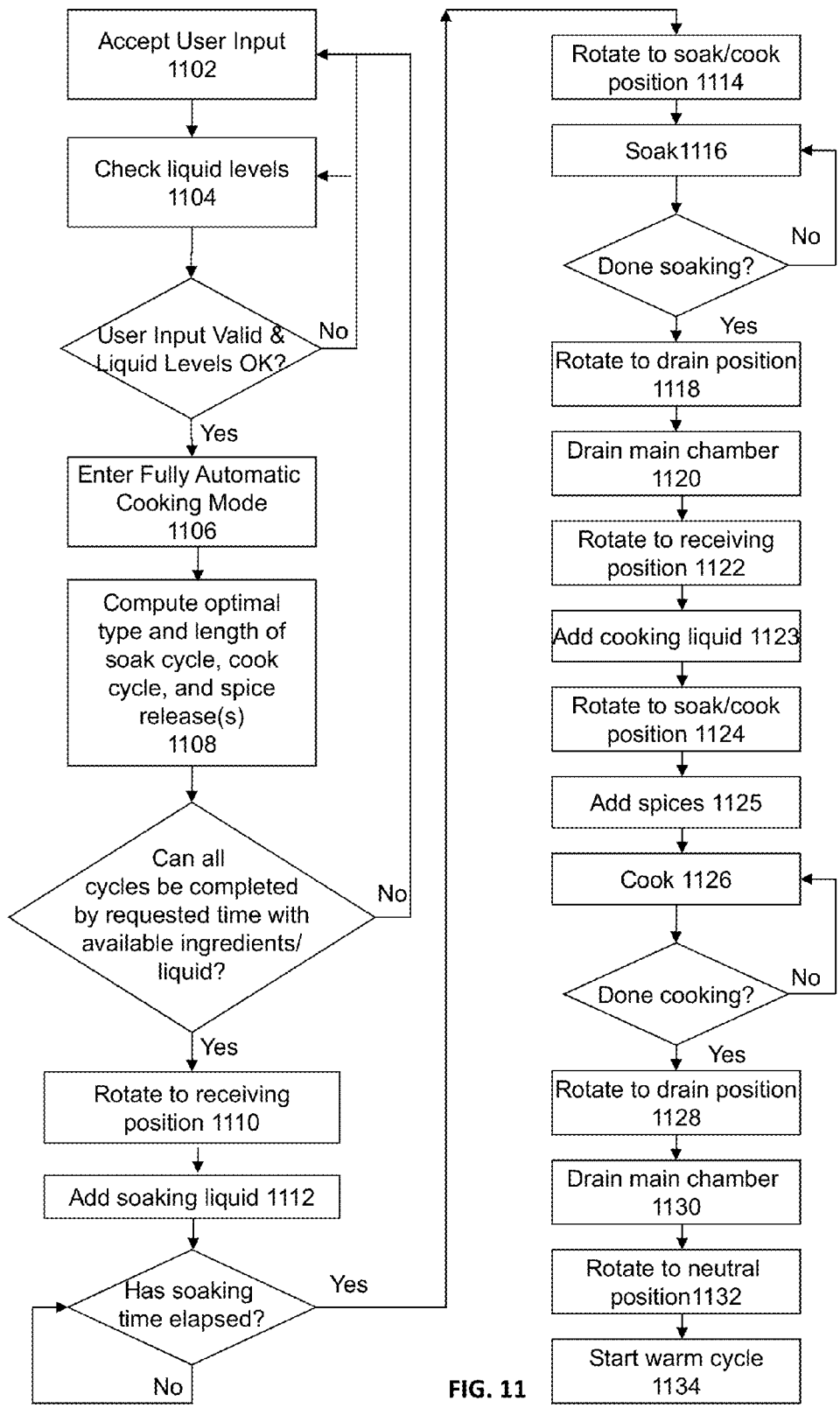
FIG. 11 is a flowchart illustrating steps performed for operating the apparatus for cooking, according to embodiments of the invention.

Referring now to FIG. 11 there is shown a flowchart illustrating the apparatus 100 method of operation for cooking, according to some embodiments of the invention. The apparatus 100 can accept 1102 user input from the display 141 about the food product type (e.g., black beans) and the total time until completion (and/or a variety of other inputs from the user), and the display 141 can communicate back to the user via various display messages. The apparatus 100 can check 1104 liquid level sensor S4 in liquid outlet container 132. If there is liquid detected in the liquid outlet container 133, the apparatus 100 can prevent further work until container 132 sensor S4 indicates it that the liquid outlet container 132 is empty, and so it can go back to step 1104 until the container 132 is empty. In some embodiments, it will provide an error message or otherwise notify the user to empty the container 132. In some embodiments, it can further check 1104 the main container 110 and provide a notification if the container 110 is not empty. In some embodiments, it can also check 1104 the liquid added to the liquid inlet container 134 to ensure that the appropriate amount has been added, and can provide an error message if there is a problem. Similarly, the apparatus 100 can confirm that the user input is valid by checking with the user or by otherwise reviewing the input to confirm validity. If the input is not valid, it can return to the step 1102 to accept new input. Steps 1102 and 1104 could be reversed in some embodiments.

Once the user confirms the input and the apparatus confirms the water level, the apparatus can then enter 1106 a fully automatic cooking mode. The apparatus 100 can compute 1108 the optimal type and length of soak-cycle, compute 1108 the optimal length of cook-cycle, compute 1108 the optimal time for spice release, etc. Depending on the food type and/or user input, in some embodiments it may compute 1108 fewer or more cycles. In one embodiment, the display 141 will cycle through messages indicating this information (e.g., "BLACK BEANS"+"RESTING"+"16 30") and can then display the message regarding the soaking cycle (e.g., "aa bb SOAKING cc dd", where aa and bb indicates time until serving and cc and dd indicate time left of soaking). In some embodiments, the apparatus 100 further determines whether the cycles can be completed by the requested time and/or with the ingredients and/or liquid available. If not, the apparatus 100 can return to the accept user input step 1102. In some embodiments, it can provide an error message or otherwise notify the user of the problem.

Once the apparatus 100 has confirmed that it can move forward, the apparatus 100 can then rotate 1110 the main container 110 to the receiving position for receiving liquid into the main container 110. The apparatus 100 can then add 1112 liquid from the liquid inlet container 134 to the main container 110, for example by opening valve 114, by pumping, or otherwise adding fresh liquid from container 134 to main container 110 to start soaking the food product. The apparatus 100 leave valve 114 open for y minutes, which will allow a certain amount of liquid (e.g., 5 cups (1 L) of water) to cover the food product. The apparatus 100 can then rotate 1114 the main container 110 into the neutral or cooking/soaking position and soak 1116 the food product for a certain amount of time in the fresh liquid. It can be finished soaking 1116 either at a set time x or when a sensor inside the main container 110 says the soaking is complete. When it is done soaking 1116, it rotates 1118 the main container 110 to the drainage/dump position and drains 1120 the soaking liquid from the main container 110 into the liquid outlet container 112 (e.g., by opening valve 112 at time x to drain the liquid in container 110 into container 132, by pumping liquid, etc.). The draining 1120 can take y2 minutes to complete. If there is a valve 112, the apparatus 100 can close valve 112 when the draining is done. The apparatus can conduct any additional soak cycles by repeating steps 1110 to 1120.

In embodiments where the apparatus 100 is configured for a sprout cycle or other similar cycles, the apparatus 100 can run steps 1110-1120 as a sprout cycle. This can be done before starting the soaking cycle. In the sprout cycle, heat can be applied, air circulation in the main container 110, agitation or movement of the food/liquid in the main container 110, etc.

The apparatus 110 next rotates 1122 back to the receiving position and adds 1123 cooking liquid from the liquid outlet container 134 to the main container 110 (e.g., by pumping or by opening valve 114 for y3 minutes to allow a certain amount of liquid (e.g., 1 cup (2 dL) of fresh water) to enter container 110). The apparatus 100 can rotate 1124 back to the horizontal position or cooking position. In some embodiments, the apparatus 100 adds 1125 spices to the main container 110 (e.g., by opening a spice hatch) and can cook 1126 (e.g., can wait for y4 minutes). In other embodiments, one or more spice hatches are opened to add 1125 spices during the cooking 1126. During the cooking 1126 time, the apparatus 100 can turn on the heater 131 or turn up the heater 131 and can display a message regarding the cooking cycle (e.g., "aa bb COOKING cc dd"). It can take z minutes for the heater 131 to start boiling the liquid in the container 110. The apparatus 100 can continue cooking the food product until it has boiled for a certain number of minutes. In some embodiments, the container 110 is slowly moved during cooking. Gases can escape from the main container via the liquid outlet 112 in some embodiments. When the cooking 1126 is done, The apparatus 100 can then rotate 1128 the container 110 back to the dump position to drain 1130 some or all of the liquid through though the outlet 112 (e.g., by opening valve 112 for y6 minutes) into container 132 (e.g., and then can close valve 112). The apparatus 110 can then rotate 1132 back to the neutral position and can start 1134 a warming cycle to keep the food warm until the user is ready to eat the food. So, the apparatus 100 can turn to low-power or a wait/warming cycle. During this time, the display 141 can provide a wait/warming message (e.g., "LOW HEAT aa bb" and count up the time aa bb). The food product can wait for the cook for several hours in this mode.

In embodiments in which the apparatus 100 has a cleaning or sterilizing cycle that is designed to clean/sterilize the apparatus after use, the container 110 can repeat steps 1120 to 1130. In some embodiments, this can start as soon as the user replaces the main container 110 into the apparatus or otherwise empties/rinses the main container 110 (or the user can enter input to start cleaning cycle). The apparatus 100 then rotates 1122 to the receiving position, adds liquid 1123, rotates 1124 to a neutral position, cooks 1126 or otherwise heats the liquid for sterilizing (it can also agitated or move to swish the liquid), and when it is done, it rotates 1128 to the dump position, drains 1130 the liquid, and rotates 1132 back to neutral. The display 141 can provide a message indicating the cleaning cycle. In some embodiments, the apparatus 100 can be dry-heated to a sterilizing temperature, filled with sterilizing steam, or the water can be brought to a boil for sterilizing the inside of the apparatus 100. Further, in some embodiments, soap can be inserted (e.g., into any of containers 110, 132, 134 or into a special hatch, such as the spice hatch, or by opening in the apparatus 100 for soap insertion), and the soap plus water can be moved around inside the apparatus 100 in the cleaning cycle. In embodiments including the cleaning cycle, one or more of the parts of the apparatus 100 can be designed to tolerate high heat. The apparatus can also be designed to dump its contents into a sink or into a kitchen garbage disposal unit (e.g., with a tube that could be snapped onto the apparatus) during the cleaning cycle. This is just one example of steps that can occur in the method, though more, fewer, or different steps can occur. In some places the method is described in terms of minutes, but it will be understood that "minutes" also includes the substitution of other criterion, such as measurements from sensors or signals from the microcontroller, e.g. based on level of fullness or weight of the main container, amount of liquid (rate of delivery or removal may vary), level of done-ness or completion for a stage in a recipe, appearance or degree of green in a sprouting/growth recipe, various sensor measurements, etc.

III. Other Designs and Uses

A. Multi-Chamber Apparatus

A variety of other designs and uses are possible for the apparatus 100. Some designs of the apparatus include multiple main containers for coordinated cooking of different food products under different or distinct conditions in each chamber. For example, beans could be prepared in one container and rice in the other. In the multi-chamber design, the main container 110 is replaced by two main containers that allow separate cooking and that may be designed for snapping into and out of the apparatus by the user according to his cooking needs. Both chambers can be thermally connected such that when the left chamber is heated the right chamber is also heated, or they could be heated separately with separate heaters. The container 110 can have two or more liquid inlet/outlets 111 for receiving liquid independently in the chambers and draining liquid independently. For example, the main container 110 can be designed with a spout on either side and can rotate in two directions to receive or release liquids. Each chamber can have one or more independent spice hatches. A microcontroller and various sensors can be used to independently operate the two chambers. Hence, the invention provides for one, two, three, four, five, or more main containers some or all of which may be independently or only jointly removable, drainable, liquid receivable, etc., with independent sensors and so forth.

B. Sprouting, Steaming, Blanching

The apparatus can be designed to allow sprouting of some foods, such as for sprouting of beans, legumes, plants, etc. In some embodiments, sprouting includes growing of plants of various types. Moisture, warmth, and in most cases, indirect or artificial sunlight may be needed for sprouting. The food to be sprouted can be placed directly into the main container 110 or into one or more removable baskets placed in the main container. The apparatus 100 can include a sprouting cycle or setting that allows the user to set the apparatus to sprout the food product (e.g., for a specified period of time, such as for 1 day, 2 days, 3 days, etc. The user can also set the apparatus to sprout for a set period of time and then automatically begin cooking after that period of time. The apparatus can be designed to allow the food product to receive light for sprouting (e.g., where the lid of the main container 110 and/or outer container 137 is transparent or allows light to pass through, where there is a growing light inside one or both containers 110, 137, etc.) The apparatus can be designed to allow for air circulation and to provide moisture (e.g., liquid inlet 115) during the sprouting process. Sensors can be used to ensure the moisture level is appropriate for sprouting. The apparatus can further include an agitator to mechanically agitate or shake the main container or the floor of the main container 110, or the container 110 can be rotated to provide agitation. The apparatus can also be used to provide warming or temperature management for sprouting. The apparatus can be further designed to control the environmental conditions inside, including the pressure, temperature, humidity, etc. to maintain the appropriate or optimal sprouting conditions for the particular food product (e.g., via the microcontroller and sensors). Sprouting of certain food products is known to provide health benefits.

The apparatus can also be designed for blanching, steaming or sterilizing food. For example, there can be separate settings or buttons of the device for these functions. The blanching function can be designed to do a quick boil or to quickly run hot water against the food product. For example, for vegetables, this could be designed to cook in a manner that does not penetrate the vegetables all the way through so that they are still crunchy, but cooked out the outside. The vegetables or other food or plant item can be placed directly inside the main container 110 for blanching or steaming, or there can be one or more insertable baskets inside the main container 110 in which the food to be blanched or steamed can be placed. Again, the environmental conditions inside the main container 110 can be controlled for steaming, blanching, and sterilizing food.

C. Cleanability and Portability

Many of the principal components of the apparatus 100 (e.g., the main container(s) 110 outlet cover 118, the outlet container 132, and other surfaces in liquid and solid contact with the main container(s) during cooking) can be removed for cleaning either manually or for placement in a standard home dish-washing machine to maintain the hygienic state of the apparatus. In some embodiments, all parts that come into contact with the food product can be removable. Components can also be sized to fit inside a standard home dish washing machine, including in the size dimensions described above, and can be coated or designed with materials that are dishwasher-safe. In some embodiments, the weight of each removable component will be suitable for easy detachability, washability, and ergonomic home use, e.g. with a weight not more than 15 pounds, 12 pounds, 10 pounds, 8 pounds, 5 pounds, 4 pounds, 3 pounds, 2 pounds, 1 pound, or 0.5 pounds. In practical uses, "detachable" or "removable" means easily removed from the device without resorting to general-purpose tools, and also means easily re-installed without those tools.

The apparatus 100 is further designed to be "portable," meaning it can be moved or carried by a single home user and can be placed on a standard home kitchen countertop with components that can be placed in a home dishwasher, etc. The device can be designed to minimize the device footprint or counter/shelf-space in a kitchen. It can be powered for use with standard household outlets and can follow appliance guidelines for standard household use. In some cases, the apparatus may incorporate portable power, such as solar cells and/or batteries to maintain partial- or full-functionality with intermittent or no connectivity to external power sources for an extended period of time. Physical design can also be adjusted for storage, portability, and placement.

The above description provides various examples of the apparatus and methods. Various other components could be included in the apparatus and various other steps in the methods, including any of components/steps and any of the different designs of component/steps described in U.S. Provisional Application No. 61/261,342 filed on Nov. 15, 2009, which is incorporated by reference herein in its entirety for all purposes, including any appendices or attachments thereof.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments. The scope of the invention is to be limited only by the following claims. As used herein any reference to "one embodiment" or "an embodiment" means that a particular element, feature, structure, or characteristic described in connection with the embodiment is included in at least one embodiment. The appearances of the phrase "in one embodiment" or "some embodiments" in various places in the specification are not necessarily all referring to the same embodiment.

We claim:

1. A portable apparatus for preparing and cooking a dry food product, comprising:
   a main container for receiving a dry food product;
   a liquid inlet container connected to the main container for storing liquid to be added to the dry food product;
   a liquid inlet opening from the liquid inlet container for controllably providing the liquid into the main container with the dry food product;
   an inlet valve connected to the liquid inlet opening for automated regulation of inflow of the liquid into the main container;
   a liquid inlet/outlet opening in the main container for controllably receiving the liquid from the liquid inlet container through the inlet valve into the main container holding the dry food product;
   a heater in contact with the main container for automated heating of the dry food product with the liquid received in the main container from the liquid inlet container;
   a display for receiving user input from a user regarding a desired time for completion of cooking of the dry food product in the main container;
   a control unit comprising:
      a controller in communication with the inlet valve for controlling opening and closing of the inlet valve based on the user input; and
      a non-transitory computer-readable storage medium comprising computer program instructions that, when executed by the controller, cause the controller to perform steps comprising:
         determining a specified time to begin a soaking cycle of the dry food product based on the user input such that a cooking cycle is completed at the desired time for completion of cooking specified by the user,
         instructing the inlet valve to open at the specified time to allow the liquid to flow from the liquid inlet container through the inlet valve into the main container holding the dry food product to begin the soaking cycle, the dry food being kept separate from the liquid in the liquid inlet container until the opening of the inlet valve,
         instructing the heater to cook the dry food product in the liquid during the cooking cycle, and
         instructing the display to indicate the cooking cycle is complete at or near the desired time for completion of cooking specified by the user.

2. The apparatus of claim 1, wherein the instructions stored by the non-transitory computer-readable storage medium further cause the controller to perform a step of accessing a plurality of recipes for soaking and cooking a plurality of types of dry food products, at least one of the plurality of recipes specifying an amount of time for soaking and cooking of each of the types of dry food products.

3. The apparatus of claim 2, wherein at least one of the plurality of recipes specifies a temperature for cooking of each of the types of dry food products, and wherein the instructions stored by the non-transitory computer-readable storage medium further cause the controller to perform a step of controlling the heater to heat the main container to the specified temperature.

4. The apparatus of claim 2, wherein at least one of the plurality of recipes specifies an amount of the liquid to be delivered to the main container and timing for delivering the liquid to the main container, and wherein the instructions stored by the non-transitory computer-readable storage medium further cause the controller to perform a step of controlling the inlet valve to deliver the specified amount according to the timing.

5. The apparatus of claim 2, further comprising a spice hatch that is configured to automatically deliver spices into the main container during cooking, wherein at least one of the plurality of recipes specifies a timing for release of the spices, and wherein the instructions stored by the non-transitory computer-readable storage medium further cause the controller to perform a step of opening or activation of the spice hatch to release the spices from the spice hatch.

6. The apparatus of claim 2, wherein at least one of the plurality of recipes specifies a timing for delivering additional liquid to the main container following the soaking cycle for beginning the cooking cycle, and wherein the instructions stored by the non-transitory computer-readable storage medium further cause the controller to perform a step of controlling the inlet valve to deliver the additional liquid according to the timing.

7. The apparatus of claim 1, further comprising a liquid outlet container configured for receiving the liquid drained from the main container and for keeping the liquid that is drained separate from the food product in the main container.

8. The apparatus of claim 7, further comprising a motor associated with the main container, the motor configured for moving the main container from a receiving position for receiving the liquid to a drainage position for draining the liquid via gravity from the main container into the liquid outlet container, and configured for moving the main container with the dry food product back to the receiving position for receiving of additional liquid into the food product in the main container.

9. The apparatus of claim 8, further comprising an outer container that holds the main container inside and that is associated with the liquid inlet container and the liquid outlet container, the outer container configured to remain stationary while the motor moves the main container between the receiving position and the drainage position.

10. The apparatus of claim 9, further comprising a cradle with at least one cradle arm reaching from the cradle to an outer container that holds the main container, the at least one cradle arm associated with the motor and configured to swing the cradle to move the main container between the receiving position and the drainage position, the heater being positioned on the cradle for movement with the cradle with the main container positioned on the heater.

11. The apparatus of claim 8, wherein the motor is configured to rotate the main container to line up the liquid inlet/outlet opening of the main container with the liquid inlet to pour the liquid from the liquid inlet container into the main container, and wherein the motor is configured to rotate the main container to position the liquid inlet/outlet opening above the liquid outlet container to drain the liquid from the main container into the liquid outlet container.

12. The apparatus of claim 8, wherein the motor is configured to physically move the main container to a first position for cooking, a second position for controlled dumping of the liquid from the main container and a third position for controlled addition of liquids or spices to the main container.

13. The apparatus of claim 1, further comprising an inlet/outlet valve connected to the liquid inlet/outlet opening, the inlet/outlet valve configured to close the inlet/outlet opening to prevent the release of the liquid or steam and configured to open to permit outflow of the liquid from the main container through the liquid inlet/outlet opening.

14. The apparatus of claim 13, wherein the inlet/outlet valve is a flap at the liquid inlet/outlet opening that is configured to open and close to control the outflow of the liquid from the main container and that is configured to close to diminish the loss of heat or vapor through the liquid inlet/outlet of the main container during preparing or cooking of the dry food product.

15. The apparatus of claim 13, wherein the inlet/outlet valve comprises a normally-closed valve that is openable by moving the main container into a drainage position for draining the liquid from the main container.

16. The apparatus of claim 1, further comprising an outlet cover positioned at the liquid inlet/outlet opening and having a plurality of openings for allowing the liquid to drain out of the main container while the main container is in a drainage position, the outlet cover configured to prevent the food product from passing through the liquid inlet/outlet opening during drainage.

17. The apparatus of claim 1, further comprising a manually openable and closeable lid that covers an opening of the main container, the lid being openable for manual access to contents of the main container, the opening being of a diameter that allows entry of a serving instrument, the lid configured for retaining heat or vapor inside the main container when the lid is closed.

18. The apparatus of claim 1, wherein the display is configured for displaying different types of dry food products for cooking from which the user can select, and wherein the instructions stored by the non-transitory computer-readable storage medium further cause the controller to perform a step of cooking the selected type of dry food product according to a stored recipe for the selected type.

19. The apparatus of claim 1, wherein the instructions stored by the non-transitory computer-readable storage medium further cause the controller to perform a step of specifying a timing for draining the liquid from the main container following a soaking cycle, and wherein the controller controls the draining of the liquid based on the instructions.

20. The apparatus of claim 1, further comprising one or more liquid level sensors in the main container for sensing a level of the liquid, and wherein the instructions stored by the non-transitory computer-readable storage medium further cause the controller to perform a step of controlling apparatus to respond to the level of the liquid sensed.

* * * * *

UNITED STATES PATENT AND TRADEMARK OFFICE
CERTIFICATE OF CORRECTION

| | | |
|---|---|---|
| PATENT NO. | : 10,226,145 B2 | Page 1 of 1 |
| APPLICATION NO. | : 15/655609 | |
| DATED | : March 12, 2019 | |
| INVENTOR(S) | : David Storek, Robert P. Otillar and Antonia L. Sequeira | |

It is certified that error appears in the above-identified patent and that said Letters Patent is hereby corrected as shown below:

In the Claims

Column 28, Line 62, after "controlling" insert --the--.

Signed and Sealed this
First Day of October, 2019

Andrei Iancu
*Director of the United States Patent and Trademark Office*